(12) United States Patent
Chen

(10) Patent No.: US 6,745,979 B1
(45) Date of Patent: Jun. 8, 2004

(54) SPACECRAFT AND AEROSPACE PLANE HAVING SCISSORS WINGS

(76) Inventor: Zhuo Chen, 807 Hampton Crossing, Norcross, GA (US) 30093

( * ) Notice: Subject to any disclaimer, the term of this patent is extended or adjusted under 35 U.S.C. 154(b) by 0 days.

(21) Appl. No.: 10/277,687

(22) Filed: Oct. 22, 2002

(51) Int. Cl.$^7$ ................................................. B64C 3/38
(52) U.S. Cl. ........................ 244/46; 244/45 R; 244/49; 244/119
(58) Field of Search .................... 244/7 A, 38, 39, 244/45 R, 46, 47, 49, 118.2, 119, 123

(56) References Cited

U.S. PATENT DOCUMENTS

| | | | | |
|---|---|---|---|---|
| 1,353,179 A | * | 9/1920 | Petrovitch | 244/49 |
| 1,355,088 A | * | 10/1920 | Carneal | 244/34 R |
| 1,376,785 A | * | 5/1921 | Sellmer | 244/49 |
| 2,162,066 A | * | 6/1939 | Asis | 244/49 |
| 3,120,361 A | * | 2/1964 | Riebe et al. | 244/46 |
| 3,971,535 A | * | 7/1976 | Jones | 244/46 |
| 4,132,374 A | * | 1/1979 | Abell | 244/46 |
| 4,453,426 A | * | 6/1984 | Groutage et al. | 74/2 |
| 4,471,923 A | * | 9/1984 | Hoppner et al. | 244/63 |
| 4,589,611 A | * | 5/1986 | Ramme et al. | 244/6 |
| 4,793,572 A | * | 12/1988 | Mecca | 244/7 R |
| 4,842,218 A | * | 6/1989 | Groutage et al. | 244/3.28 |
| 4,998,689 A | * | 3/1991 | Woodcock | 244/46 |
| 5,031,857 A | | 7/1991 | MacConochie | |
| 5,078,339 A | * | 1/1992 | Lapidot | 244/49 |
| 5,118,052 A | * | 6/1992 | Alvarez Calderon F | 244/49 |
| 5,154,370 A | * | 10/1992 | Cox et al. | 244/3.27 |
| 5,454,530 A | * | 10/1995 | Rutherford et al. | 244/7 A |
| 5,615,846 A | * | 4/1997 | Shmoldas et al. | 244/3.28 |
| 5,671,898 A | * | 9/1997 | Brown | 244/46 |
| 5,992,796 A | * | 11/1999 | Smith | 244/45 A |
| 6,029,928 A | | 2/2000 | Kelly | |
| 6,119,985 A | * | 9/2000 | Clapp et al. | 244/172 |
| 6,161,799 A | * | 12/2000 | Nyhus | 244/7 A |
| 6,244,537 B1 | * | 6/2001 | Rutherford | 244/7 A |
| 6,450,452 B1 | | 9/2002 | Spencer | |
| 6,601,795 B1 | * | 8/2003 | Chen | 244/46 |

OTHER PUBLICATIONS

U.S. patent application Ser. No. 10/227,130, Chen, filed Aug. 23, 2002.
U.S. patent application Ser. No. 10/197,358, Chen, filed Jul. 16, 2002.
Frank Morring, Jr; Northrop Adopts Twin–Booster for SLI; Aviation Week And Space Technology, Sep. 16, 2002, p. 32–33.
Frank Morring, Jr; SLI Shifting To Use Kerosene First Stage; Aviation Week and Space Technology, Apr. 1, 2002, p. 28–29.

(List continued on next page.)

Primary Examiner—Charles T. Jordan
Assistant Examiner—Stephen Holzen

(57) ABSTRACT

A spacecraft such as a fly back booster or a reusable launch vehicle, or an aerospace plane has a fuselage and a set of scissors wings consisting of two main wings. Both of the main wings are rotatably mounted on the fuselage and can be yawed at opposite directions. If the spacecraft is launched vertically, both of its main wings can be yawed to be generally parallel with its fuselage so that it can connect with other vehicle or vehicles to form different launch configurations. When the spacecraft or aerospace plane is flying in the air, landing, or taking off horizontally, it can yaw both of its main wings in opposite directions to maximize its lift-to-drag ratio by optimizing the yaw angle of the main wings according to flying conditions. It can also produce desired aerodynamic characteristics such as forming a high drag configuration by adjusting the yaw angle of its main wings. The scissors wings can be used on a spacecraft that is launched vertically on the ground, or a spacecraft that is carried to the air and launched in the mid-air, or a spacecraft that takes off horizontally like an aircraft or glider. The scissors wings can also be used on an aerospace plane.

1 Claim, 21 Drawing Sheets

OTHER PUBLICATIONS

Edward Phillips; NASA To Test 'Slow' Hypersonic Vehicles; Aviation Week And Space Technology, Jan. 28, 2002, p. 40–41.

Robert Wall; Darpa Contemplates Hypersonic Space Plane Demo; Aviation Week And Space Technology, Sep. 9, 2002, p. 81.

* cited by examiner

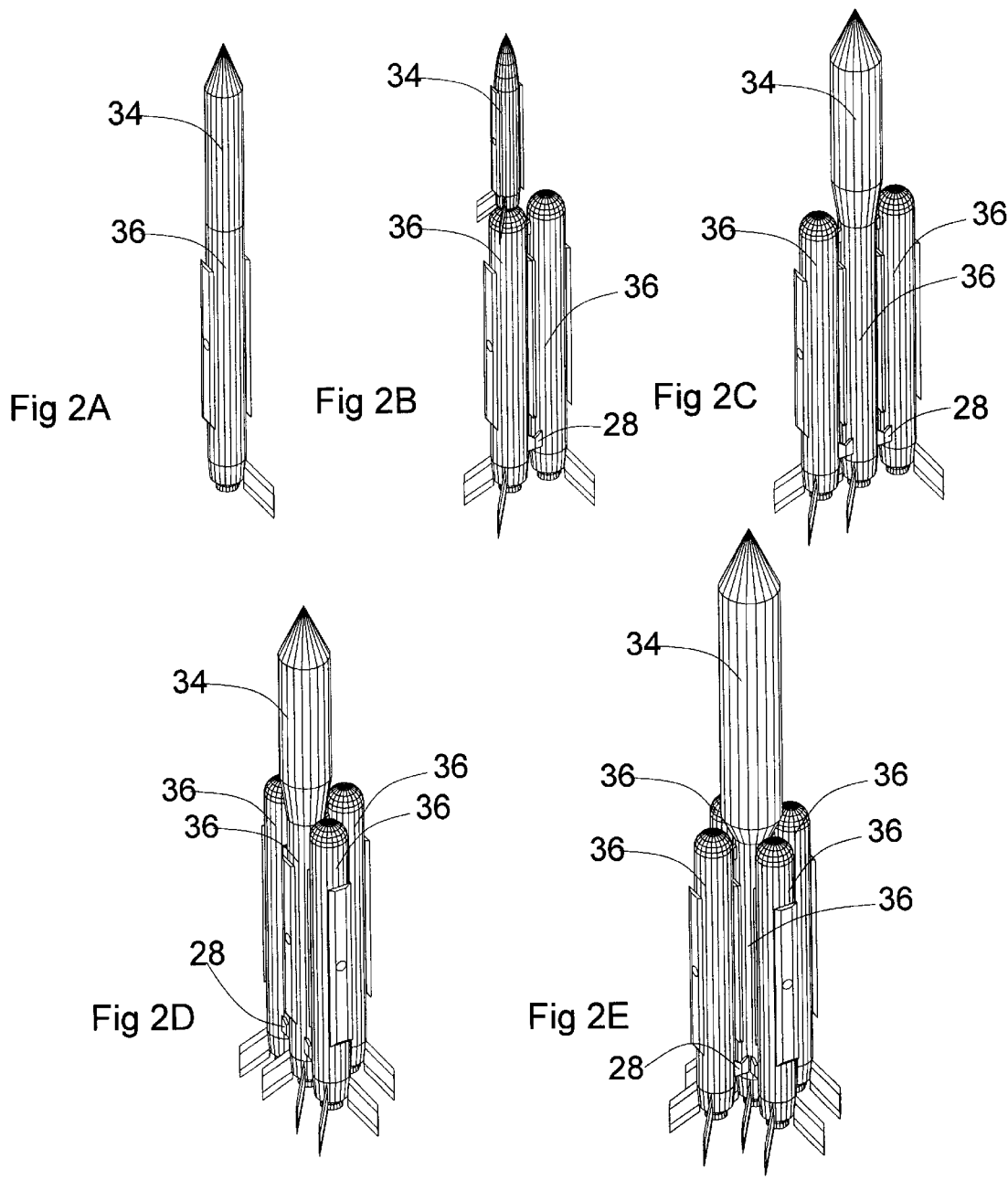

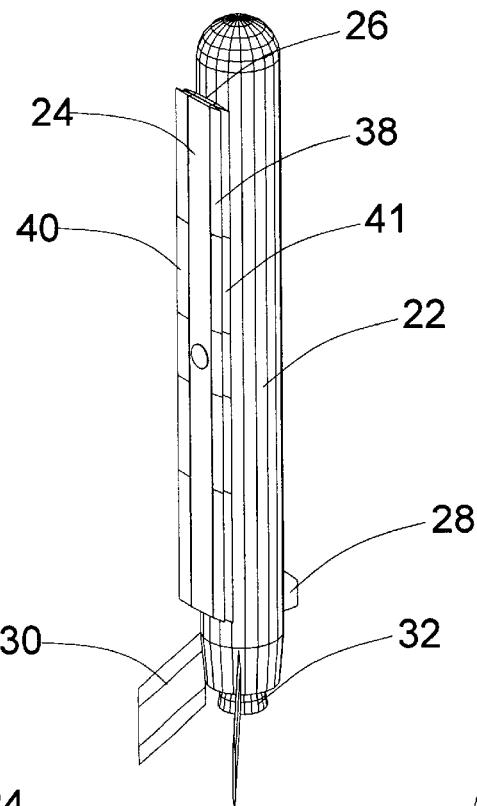
Fig 4A
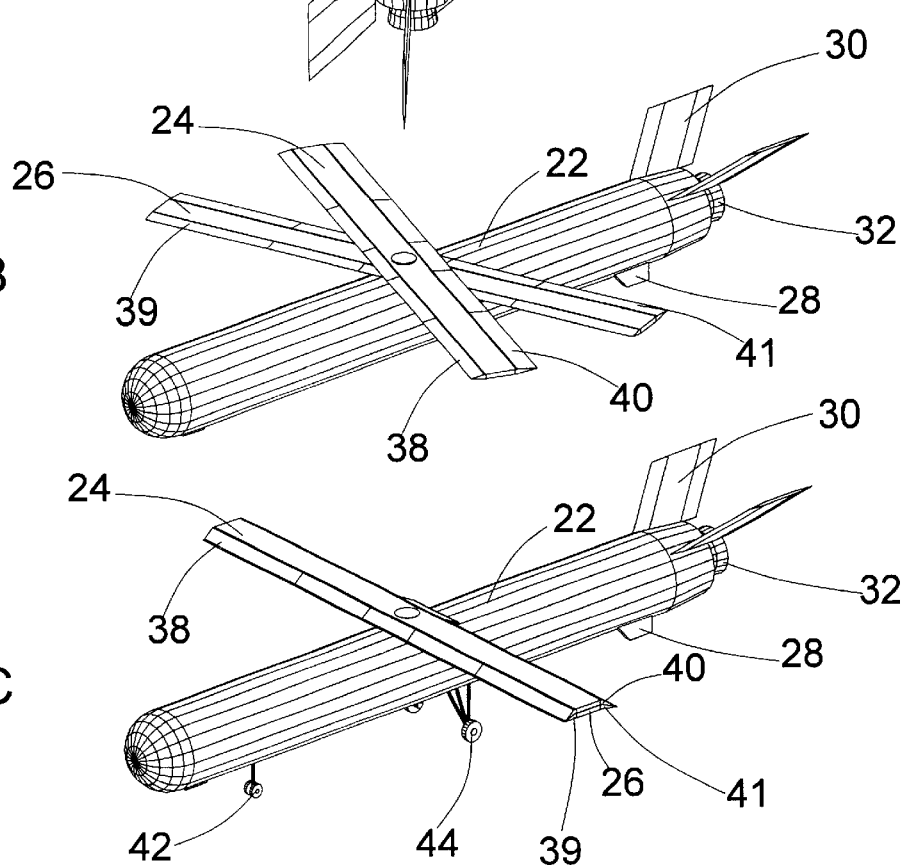
Fig 4B
Fig 4C

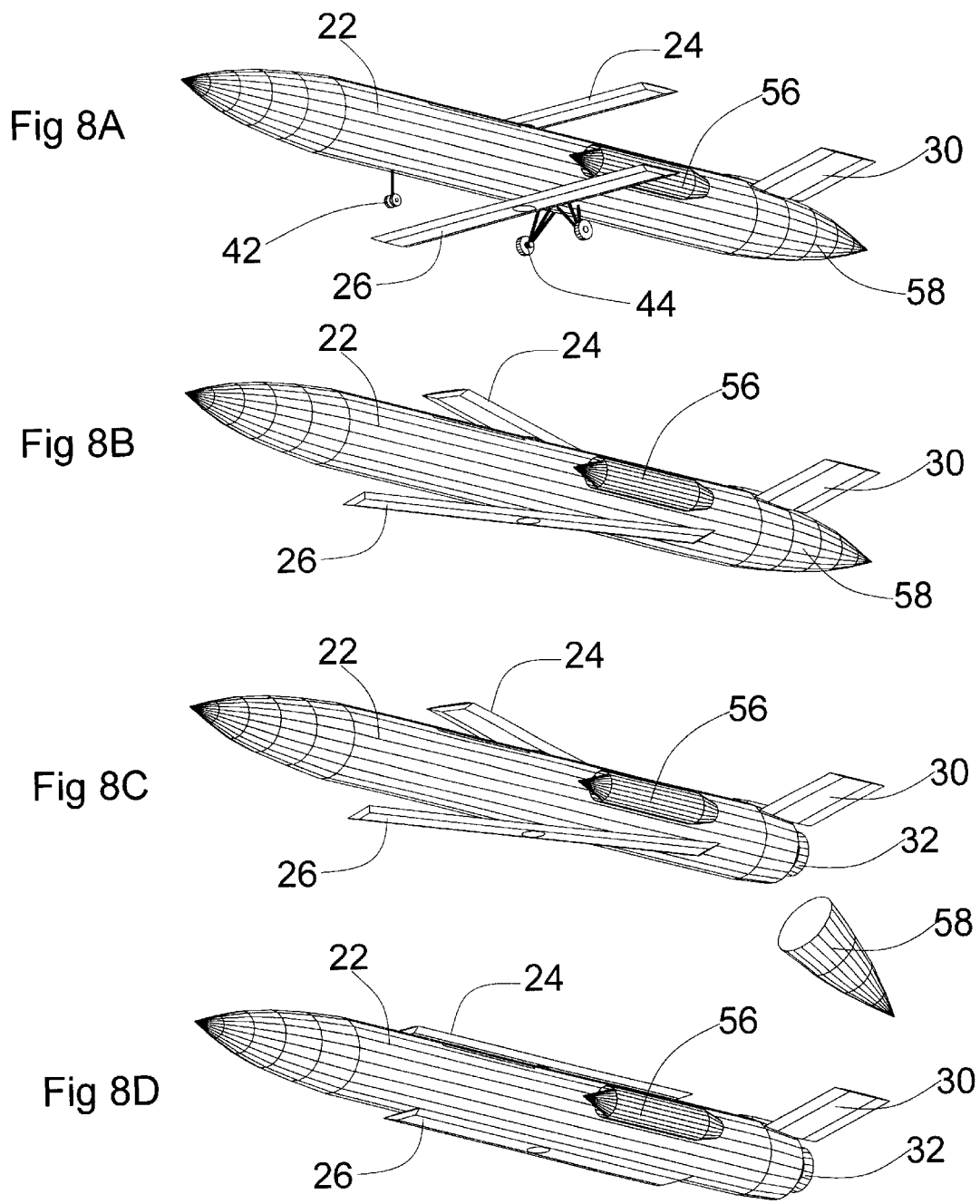

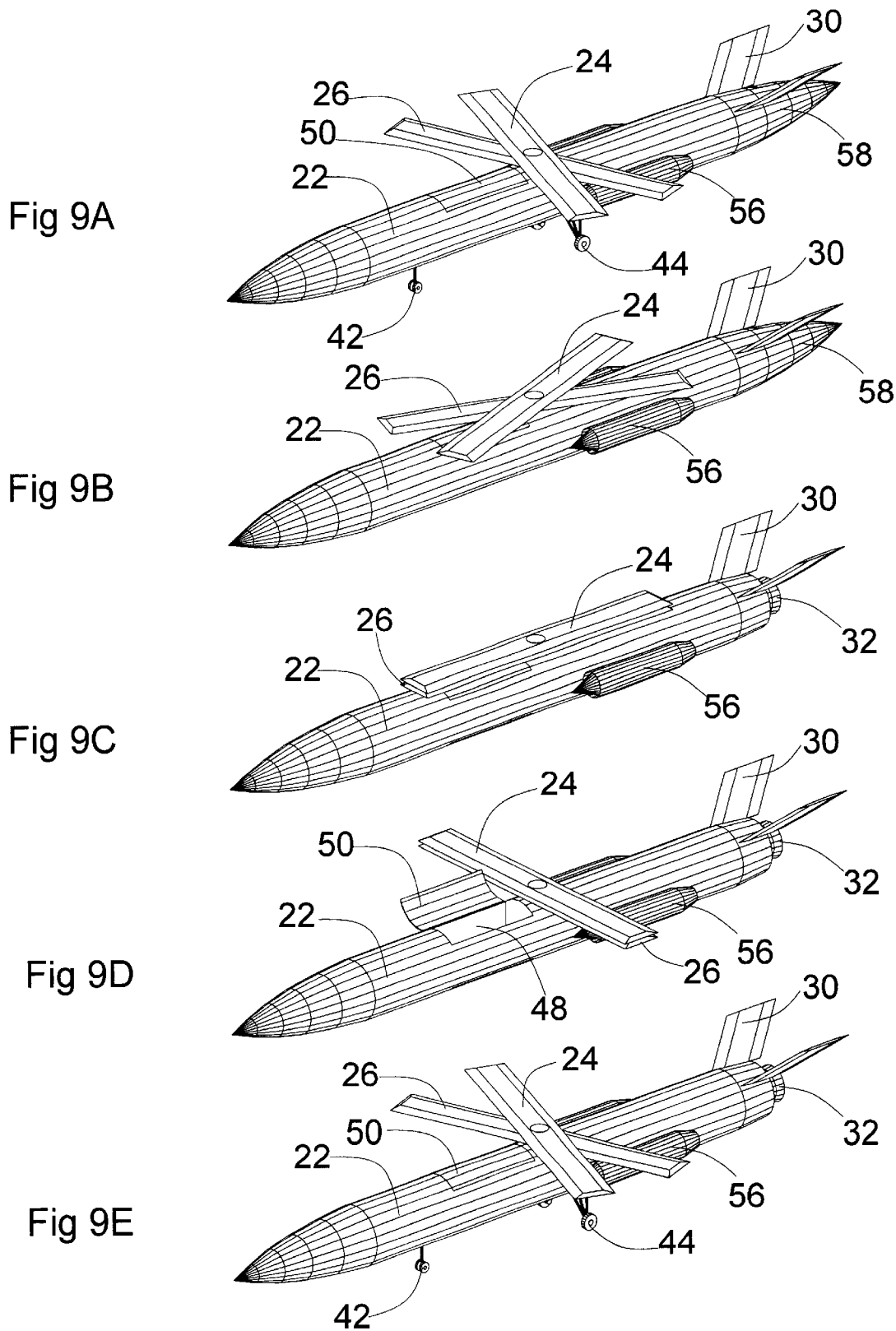

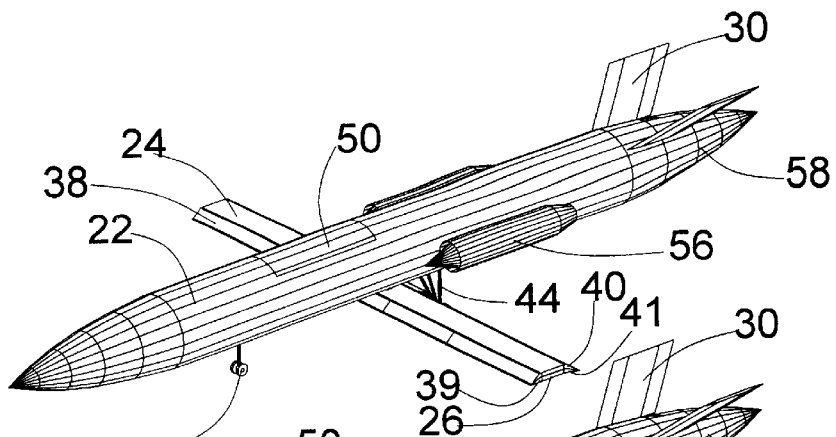
Fig 10A
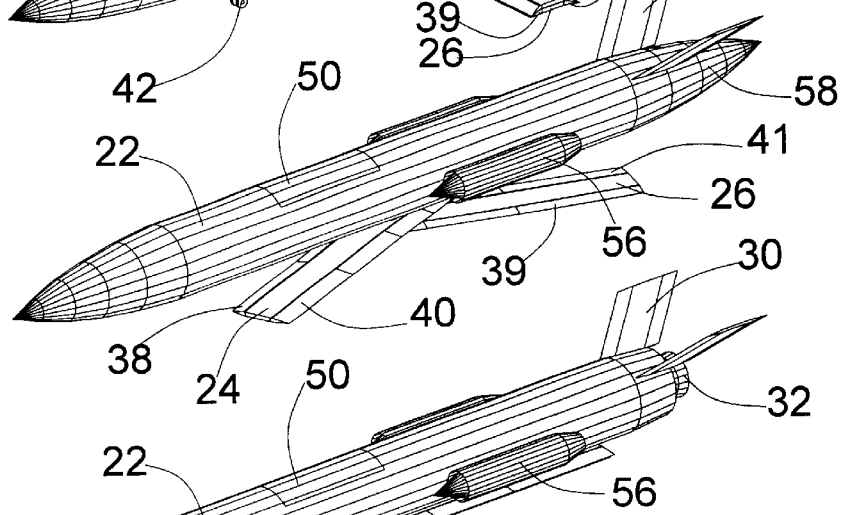
Fig 10B
Fig 10C
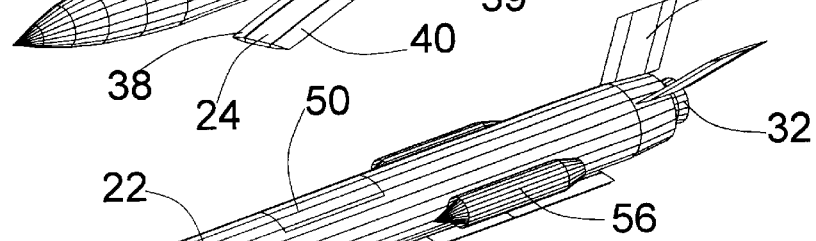
Fig 10D
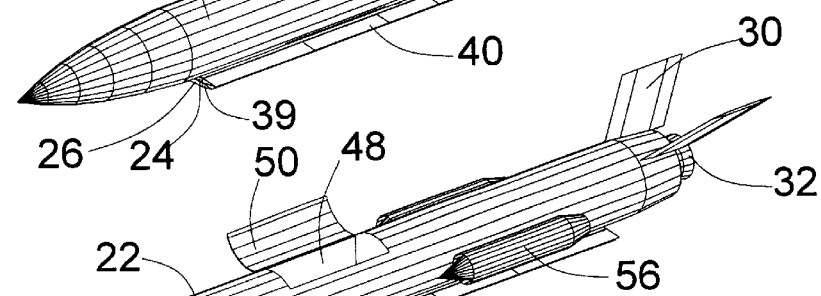
Fig 10E
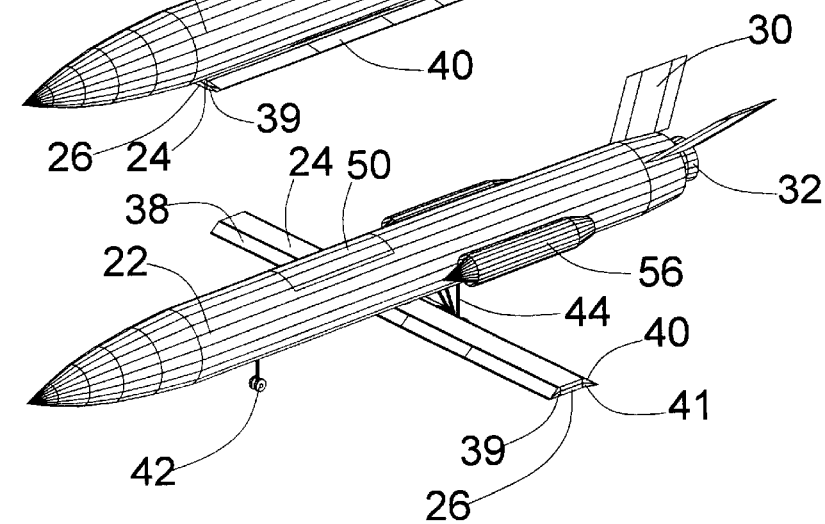

SPACECRAFT AND AEROSPACE PLANE HAVING SCISSORS WINGS

CROSS-REFERENCE TO RELATED APPLICATIONS

This application is a further development of my patent with title of Air Vehicle Having Scissors Wings and U.S. Pat. No. 6,601,795.

FEDERALLY SPONSORED RESEARCH

Not Applicable

REFERENCE TO SEQUENCE LISTING, A TABLE, OR A COMPUTER PROGRAM LISTING COMPACT DISK APPENDIX

Not Applicable

1. Field of Invention

The invention relates in general to spacecraft and aerospace plane, in particular, to fly back boosters that can be recovered after use, to reusable launch vehicles that can go to and come back from Earth orbits, and to aerospace vehicles that can fly at hypersonic speed in the air and/or go to and come back from Earth orbits.

2. Description of Prior Art

Fly Back Booster

Most existing designs of fly back boosters are based on configurations of fixed wings with fixed sweep angles. These fixed wings stick out from the fuselages of fly back boosters thus limit the flexibility of forming different launch configurations by connecting a fly back booster with other fly back booster(s) and/or other vehicle(s). In addition, most designs of fixed-wing fly back boosters choose wings with low aspect ratio. A fly back booster with wings of low aspect ratio requires relatively high engine thrust to fly at low speed, has high landing speed, and needs long runway for landing because this kind of wings have low lift-to-drag ratio (L/D) at low speed.

U.S. Pat. No. 6,450,452 "Fly Back Booster" issued to R. Spencer et al invents a fly back booster having a pair of fixed wings and a pair of canards. As the fixed wings stick out from the fuselage of the fly back booster, they prevent the fly back booster from having a lot of ways to connect with other fly back booster(s) and/or other vehicle(s) to form different launch configurations.

Shown at page 32 of the Sep. 16, 2002 issue of Aviation Week and Space Technology, Northrop Grumman proposed a fly back booster having a pair of foldable fixed wings. The fixed sweep angle, low aspect ratio wings are folded when the fly back booster is connected to a core vehicle. After the fly back booster is separated from the core vehicle, the folded fixed wings are unfolded so that they can make the fly back booster fly back. This design increases the booster's weight not only by adding a folding/unfolding system but also by increasing the wings' structural weight because the structures of foldable wings are not continuous thus are heavier than wings that are not foldable. Had the extra weight of the foldable wings been saved, either higher orbital height or more payload can be achieved.

Besides designs based on fixed wings with fixed sweep angles, U.S. Pat. No. 5,031,857 issued to I. MacConochie et al invents a fly back booster having a variable oblique wing. When being connected to other vehicle(s), the fly back booster's oblique wing is yawed to be generally parallel with the longitudinal axis of the fly back booster. By this way, the fly back booster is very flexible to form different launch configurations by connecting with other fly back boosters and/or other vehicles. However, oblique wing has inherent aerodynamic disadvantages that may prevent it from being used on fly back boosters. The major shortcoming is stability and control problem of oblique wings. That is, when the oblique wing is yawed at an angle so that half of the oblique wing becomes a swept-forward wing and another half becomes a swept-back wing, the roll control and pitch control of the fly back booster is coupled, making it difficult to control and maintain stability. For example, suppose the wing is yawed to an angle so that the right side of the wing becomes a swept-forward wing, the left side of the wing becomes a swept-back wing, and the fly back booster uses ailerons or flaperons to achieve roll control. When the fly back booster needs to bank to the left, it will make an unexpected nose-up movement while banking to the left. On the country, when the fly back booster needs to bank to the right, it will make an unexpected nose-down movement while banking to the right. This inherent problem makes oblique wing difficult to be used on fly back boosters.

Reusable Launch Vehicle

The Space Shuttle currently being used in the United States has a pair of fixed sweep angle, low aspect ratio wings. These wings do not give the Space Shuttle good performance at low speed and landing. For example, the touchdown speed of the Space Shuttle is 341 km/h (212 mph) to 363 km/h (226 mph) when the Space Shuttle has a landing weight of 104, 328 kg (230,000 lb). In contrast, the approach speed of Boeing 747 is 284 km/h (176 mph) even though the Boeing 747 has a landing weight of 260,360 kg (574,000 lb).

Shown at page 32 of the Sept. 16, 2002 issue of Aviation Week and Space Technology, Northrop Grumman proposed a concept of a fixed-wing reusable launch vehicle (the core vehicle). The sticking out fixed sweep angle fixed wings of the reusable launch vehicle limit the ways to connect boosters onto the reusable launch vehicle and force the boosters to have foldable wings that are heavy and complex.

Shown at page 28 of the Apr. 1, 2002 issue of Aviation Week and Space Technology, Northrop Grumman and Orbital Science proposed a concept of launching a fixed sweep angle fixed-wing reusable launch vehicle from the back of a flying aircraft. As shown in the picture on this page, the fixed-wing reusable launch vehicle has a pair of low aspect ratio wings and is mounted on the back of a flying wing type aircraft that can fly at subsonic speed. Right after separated from the aircraft, the reusable launch vehicle with low aspect ratio wings will have lower lift-to-drag ratio thus needs higher propulsion energy to generate enough lift than a reusable launch vehicle with high aspect ratio wings. If there is a kind of wings that can have high lift-to-drag ratio (L/D) at both low and high speed, some of the propulsion energy used to generated enough lift can be saved to accelerate the reusable launch vehicle to achieve higher orbit height or more payload.

U.S. Pat. No. 6,119,985 issued to M. Clapp invented a reusable launch vehicle having air-breathing engine(s) so that it can horizontally take off like an aircraft, has its oxidizer tank(s) filled by another aircraft in the mid-air, and fly to Earth orbit with its rocket engine(s). Shown in the patent, the reusable launch vehicle also has a pair of fixed sweep angle, low aspect ratio wings, The low lift-to-drag ratio (L/D) feature of these wings at low speed makes the reusable launch vehicle needs relatively high engine thrust and high fuel consumption to take-off and climb to high altitude in the air. If there is a kind of wings that can have high lift-to-drag ratio (L/D) at both low and high speed, the reusable launch vehicle can use smaller thus lighter air-breathing engine(s) and save more fuel for the rocket engine(s) to achieve higher orbital height or carry more payload.

U.S. Pat. No. 6,029,928 issued to M. Kelly invents a reusable launch vehicle that is towed by an aircraft to take-off horizontally and to reach an altitude in the air like a glider. After separates from the towing aircraft, the reusable launch vehicle accelerates and flies to Earth orbit on its own engine(s). In order to have satisfied aerodynamic performance for both gliding and high speed flying, the invention uses lifting surfaces like large delta wings, variable sweep wings, and variable X-wing that has a pair of high speed wings and a pair of low speed wings. However, both the large delta wings with big wing area and variable sweep wings are heavy, making the reusable launch vehicle less efficient. The variable X-wing is easy to cause unstable conditions when it is being rotated to switch between the high speed wings and low speed wings, making it difficult to be used on reusable launch vehicles. The above analysis indicates that Kelly's invention needs a kind of wings that is not heavy, and can have high lift-to-drag ratio (L/D) at both low speed and high speed.

Aerospace Plane

Shown at page 40 of the Jan. 28, 2002 issue of Aviation Week And Space Technology and page 81 of the Sep. 9, 2002 issue of the same magazine, the configurations of aerospace planes like X-43 and HyperSoar are mainly designed to optimize hypersonic performance of the aerospace plane but has sacrificed its low speed performance. Both X-43 and HyperSore mainly use a flat fuselage with very low aspect ratio to generate lift. Although they have a pair of wings at the tail of the fuselage and may have a pair of canard, they are also of low aspect ratio. This kind of low aspect ratio configurations has low lift-to-drag ratio (L/D) at low speed, making the aerospace plane need long runway to take-off and land, has high fuel consumption while flying at low speed, and reguire high engine thrust thus bigger engine(s) to take-off, climb and accelerate to its cruising altitude, and land. If the aerospace plane has a kind of wings that have high lift-to-drag ratio (L/D) at subsonic, transonic, and supersonic speed without deteriorating its hypersonic performance, it will have greater flexibility, longer range, and higher payload capability.

SUMMARY OF THE INVENTION

The fundamental object and advantage of my invention is to make a spacecraft and an aerospace plane that can efficiently, effectively, and flexibly fly at a wide range of speed. Specifically, the objects and advantages of a spacecraft and aerospace plane based on my invention are:

| | Fly Back Booster | Reusable Launch Vehicle | Aerospace Plane |
|---|---|---|---|
| Vertical Launch | Make fly back boosters and reusable launch vehicles flexibly form different launch configurations by connecting with different vehicles. | | Not applicable. |
| Horizontal Take-Off | Not applicable. | Make reusable launch vehicles and aerospace planes achieve good horizontal take-off performance either with their own engines or being towed by aircraft. | |
| Horizontal Launch | Not applicable. | Help reusable launch vehicles and aerospace planes smoothly separate | |

-continued

| | Fly Back Booster | Reusable Launch Vehicle | Aerospace Plane |
|---|---|---|---|
| | | from the aircraft carrying or towing them and quickly achieve steady and sustainable flying condition after the separation. | |
| Climb and Accelerate In The Air | Not applicable. | Make reusable launch vehicles and aerospace planes achieve efficient climb and acceleration in the air at subsonic, transonic, and supersonic speed after their horizontal take-off or horizontal launch. | |
| Return Flight | Make fly back boosters, reusable launch vehicles, and aerospace planes achieve efficient controlled flight in the air at supersonic, transonic, and subsonic speed during their return flights. | | |
| Landing | Make fly back boosters, reusable launch vehicles, and aerospace planes achieve good landing performance. | | |

A scissors wings configuration for spacecraft and aerospace planes has been invented to achieve the above-mentioned objects and advantages. The scissors wings consist of two continuous, generally straight main wings rotatably installed on the fuselage of a spacecraft or an aerospace plane via one or two hub device(s) like pivot(s) or hollow turret(s). Both of the main wings can have control surfaces like ailerons, lift-generating devices like flaps, and other devices. Both of the main wings can be turned or yawed at opposite directions with generally the same yaw angle.

One way to install the main wings is to have one main wing mounted above or at the upper part of the fuselage of the spacecraft or aerospace plane and another mounted beneath or at the lower part of the fuselage. The second way to install the main wings is to mount both of the main wings above or at the upper part of the fuselage with one main wing over another. Similarly, the third way to install the main wings is to mount both of the main wings beneath or at the lower part of the fuselage with one main wing over another. The fourth way to install the main wings is to mount both of the main wings at around the middle part of the fuselage with one main wing over another.

The following paragraphs explain how can the invention achieve the above-mentioned objects and advantages:

First, if spacecraft are launched vertically like the Space Shuttle, the invention can make them flexibly form different launch configurations by connecting with other vehicles. When a spacecraft is at vertical launch position, both of the main wings are yawed or turned so that their long axes are generally parallel with the longitudinal axis of the spacecraft's fuselage. By this way, the spacecraft does not have main wings that stick out to prevent it from connecting with other vehicles.

Second, if spacecraft and aerospace planes take-off like aircraft or gliders, the invention can make them achieve good horizontal take-off performance. During horizontal take-off, both of the main wings are yawed to be either generally perpendicular to the longitudinal axis of the fuselage of a spacecraft or aerospace plane or only have small sweep angles. By this way, the main wings can have high aspect ratio to achieve high lift-to-drag ratio (L/D) at low speed, making the spacecraft or aerospace plane able to become airborne at relatively low speed with low engine thrust or towing force.

Third, if spacecraft and aerospace planes are carried or towed to be airborne and launched in the mid-air, the invention can help them smoothly separate from the aircraft carrying or towing them and quickly achieve steady and sustainable flying condition after the separation. No matter the separation occurs at subsonic or supersonic speed, a spacecraft or aerospace plane can adjust the yaw angle of its main wings to have an optimized aerodynamic character for the separation and then quickly adjust the yaw angle to fly on its own.

Forth, the invention can make spacecraft and aerospace planes achieve efficient climb and acceleration in the air at subsonic, transonic, and supersonic speed after their horizontal take-off or horizontal launch. A spacecraft or aerospace plane with scissors wings only needs relatively low engine thrust and low fuel consumption during its climb and acceleration in the air because it can maximize its lift-to-drag ratio (L/D) at a wide range of speed by adjusting the yaw angle of its main wings. This efficiency can save fuel for longer range, higher orbital height, or more payload.

Fifth, during the return flights of spacecraft and aerospace planes after they finish their space or hypersonic flights, the invention can make them achieve efficient and effective controlled flight in the air at supersonic, transonic, and subsonic speed. Also due to scissors wings' ability to maximize lift-to-drag ratio (L/D) at a wide range of speed, a spacecraft or aerospace plane with scissors wings can have better gliding performance, needs smaller engine(s), and consumes less fuel during its return flight than the ones with other aerodynamic configurations like low aspect ratio wings.

Sixth, the invention can make spacecraft and aerospace planes achieve good landing performance. During landing, both of the main wings are yawed to be generally perpendicular to the longitudinal axis of the fuselage of a spacecraft or aerospace plane or only have small yaw angle. By this way, the spacecraft or aerospace can have a high aspect ratio configuration to achieve low approach speed. The low approach speed makes it land on short runways, have lightweight landing gears because the impact load for touchdown is also low, and have lighter breaks on landing gears.

BRIEF DESCRIPTION OF THE SEVERAL VIEWS OF THE DRAWING

In the drawings, closely related figures have the same number but different alphabetic suffixes.

FIG. 2A shows a perspective view of a fly back booster forms the first stage of a launch system.

FIG. 2B shows a perspective view of two fly back boosters connect together for a launch system.

FIG. 2C shows a perspective view of three fly back boosters connect together for a launch system.

FIG. 2D shows a perspective view of four fly back boosters connect together for a launch system.

FIG. 2E shows a perspective view of five fly back boosters connect together for a launch system.

FIG. 4A shows a perspective view of a fly back booster whose two main wings are mounted on the back of its fuselage and are yawed to be generally parallel with the longitudinal axis of its fuselage at vertical launch position.

FIG. 4B shows a perspective view of the fly back booster shown in FIG. 4A flying in the air during its return flight with both of its main wings yawed to an angle to maximize its lift-todrag ratio (L/D).

FIG. 4C shows a perspective view of the fly back booster shown in FIG. 4A ready for landing during its return flight with its landing gears stretched out and both of its main wings yawed to be generally perpendicular to the longitudinal axis of its fuselage and form a single wing by dropping their leading edge and trailing edge flaps and/or flaperons.

FIG. 8A shows a parallel view of a reusable launch vehicle that can take-off like an aircraft or a glider taking off from runway with its landing gears stretched out and both of its main wings yawed to be generally perpendicular to the longitudinal axis of its fuselage.

FIG. 8B shows a parallel view of the reusable launch vehicle shown in FIG. 8A climbing and accelerating in the air on its air-breathing engines and with both of its main wings yawed to an angle to maximize its lift-to-drag ratio (L/D).

FIG. 8C shows a parallel view of the reusable launch vehicle shown in FIG. 8A ready to ignite its rocket engine with its tail fairing being removed.

FIG. 8D shows a parallel view of the reusable launch vehicle shown in FIG. 8A climbing and accelerating toward Earth orbit powered by its rocket engine.

FIG. 9A shows a perspective view of a reusable launch vehicle that can take-off like an aircraft or glider with both of its main wings mounted on the back of its fuselage and it is taking off from runway with both of its main wings yawed to a small angle and its landing gears stretched out.

FIG. 9B shows a perspective view of the reusable launch vehicle shown in FIG. 9A climbing and accelerating in the air on its air-breathing engines and with both of its main wings yawed to an angle to maximize its lift-to-drag ratio (L/D).

FIG. 9C shows a perspective view of the reusable launch vehicle shown in FIG. 9A climbing and accelerating toward Earth orbit on its rocket engine with its tail fairing removed.

FIG. 9D shows a perspective view of the reusable launch vehicle shown in FIG. 9A at the Earth orbit with its cargo bay door opened.

FIG. 9E shows a perspective view of the reusable launch vehicle shown in FIG. 9A ready for landing during its return flight from the Earth orbit with its landing gears stretched out and both of its main wings yawed to a small angle to form a high aspect ratio configuration.

FIG. 10A shows a perspective view of a reusable launch vehicle that can take-off like an aircraft or glider with both of its main wings mounted on the back of its fuselage and it is taking off from runway with both of its main wings yawed to be generally perpendicular to the longitudinal axis of its fuselage to form a single wing by dropping their leading and trailing edge flaps and flaperons and with its landing gears stretched out.

FIG. 10B shows a perspective view of the reusable launch vehicle shown in FIG. 10A climbing and accelerating in the air on its air-breathing engines and with both of its main wings yawed to an angle to maximize its lift-to-drag ratio (L/D).

FIG. 10C shows a perspective view of the reusable launch vehicle shown in FIG. 10A climbing and accelerating toward Earth orbit on its rocket engine with its tail fairing removed.

FIG. 10D shows a perspective view of the reusable launch vehicle shown in FIG. 10A at the Earth orbit with its cargo bay door opened.

FIG. 10E shows a perspective view of the reusable launch vehicle shown in FIG. 10A ready for landing during its return flight from the Earth orbit with its landing gears stretched out and both of its main wings yawed to be generally perpendicular to the longitudinal axis of its fuselage and form a single wing by dropping their leading and trailing edge flaps and flaperons.

DETAILED DESCRIPTION OF THE INVENTION-PREFERRED EMBODIMENTS

Fly Back Booster

Figure 1A:
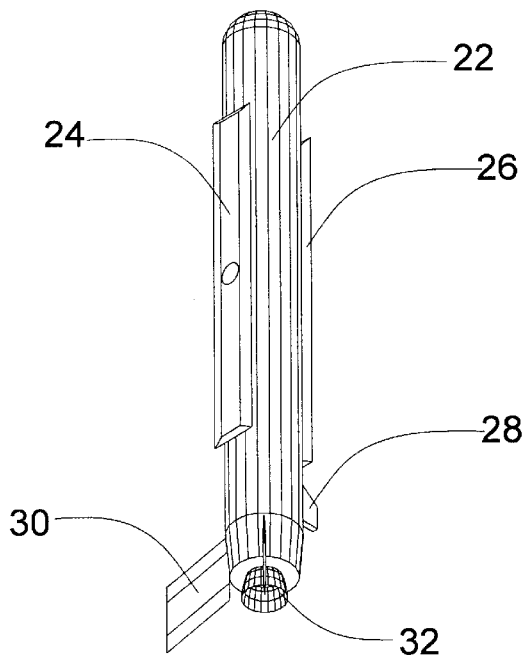
FIG. 1A shows a parallel view of a fly back booster at vertical launch position with both of its main wings yawed to be generally parallel with the longitudinal axis of its fuselage.

FIG. 1A to FIG. 2E show the preferred embodiment of a fly back booster based on the invention. FIG. 1A to FIG. 1C indicate how a fly back booster works, and FIG. 2A to FIG. 2E indicate how one or more fly back boosters form different launch configurations.

In FIG. 1A, a fly back booster is at vertical position and ready to launch payload either by installing upper stage(s) and payload on it or connecting it with other fly back boosters and/or other vehicle(s) to form different launch configurations for launch systems. As shown in the figure, it has two main wings, upper main wing 24 is rotatably mounted on the back of its fuselage 22 and lower main wing 26 is rotatably mounted at the belly of its fuselage 22. Both of the main wings are yawed to be generally parallel with the longitudinal axis of fuselage 22 so that the fuselage can get close to other fly back boosters and/or other vehicles from many directions and get connected with them. Two control surfaces 30 are installed at the tail of fuselage 22 and a rocket engine nozzle 32 can be seen at the tail of fuselage 22. Connection/separation assemblies 28 are installed on fuselage 22 to connect the fly back booster to other vehicles to form launch configurations and separate the fly back booster from them for staging. Holding device(s) in addition to the pivots or hollow turrets for mounting the main wings can be installed on fuselage 22 to help hold secure both of the main wings when the fly back booster is providing thrust to a launch system. The holding device(s) is not shown in all the figures of fly back boosters because a fly back booster may or may not need the holding device(s).

Figure 1B:
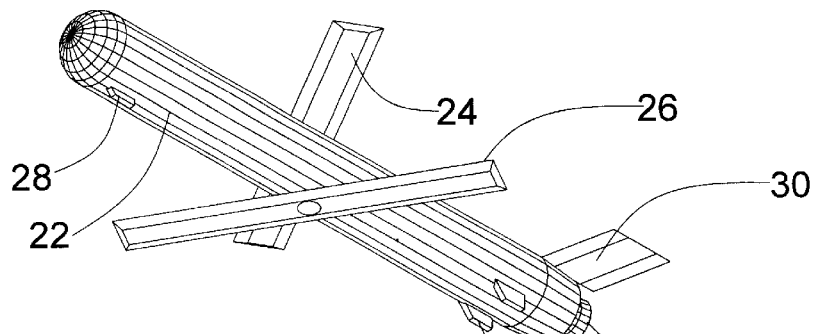
FIG. 1B shows a parallel view of the fly back booster shown in FIG. 1A flying in the air during its return flight with both of its main wings yawed to an angle to maximize its lift-to-drag ratio (L/D).

In FIG. 1B the fly back booster is at its return flight after separate from upper stage(s), payload, and/or other vehicle (s). As shown in the figure, the fly back booster can adjust the yaw angle of both its main wings 24 and 26 to maximize it lift-to-drag ratio (L/D) so that if return engine(s) are installed, low engine thrust is required thus relatively small engine(s) can be installed and less fuel can be consumed. If no return engine is installed, the fly back booster can glide over a long distance because it can maximize its lift-to-drag ratio (L/D) during almost the entire course of its return flight. The return engine(s) for return flight is not shown in all the figures of fly back boosters because first, a fly back booster may or may not need return engine; second, there are many ways to install return engine(s) on the a fly back booster.

Figure 1C:
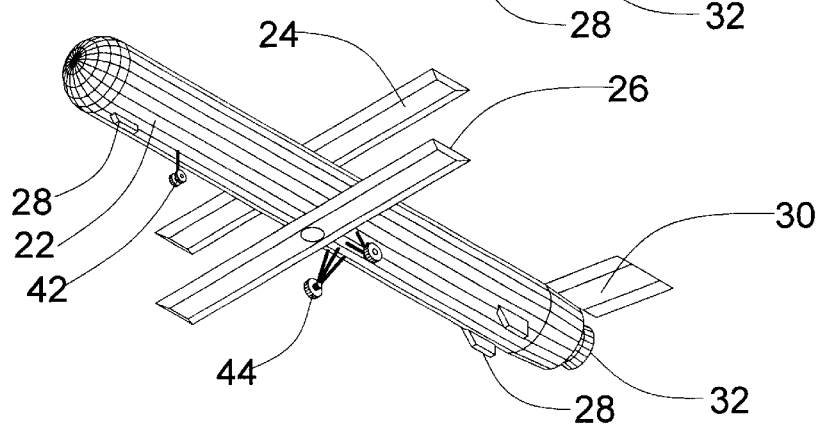
FIG. 1C shows a parallel view of the fly back booster shown in FIG. 1A ready for landing during its return flight with its landing gears stretched out and both of its main wings yawed to be generally perpendicular to the longitudinal axis of its fuselage.

In FIG. 1C, the fly back booster is ready for landing at the end of its return flight. Both of its main wings 24 and 26 are yawed to be generally perpendicular to the longitudinal axis of fuselage 22, forming an aerodynamic configuration similar to a biplane. This biplane-like configuration can help the fly back booster achieve low approach speed and short landing distance. In addition, the low impact load caused by the low speed landing makes the fly back booster able to use light and simple landing gears. Furthermore, the short landing distance also reduces the requirement for landing gear breaks, making light and simple breaks enough for the landing.

The fly back booster is very easy to form different launch configurations by connecting with other fly back boosters and/or other vehicles. FIG. 2A shows one fly back booster 36 serves as the first stage of a launch system by connecting with upper stage(s) and payload 34. FIG. 2B to FIG. 2E show some of the many ways to connect different number of fly back boosters to form different launch configurations. In FIG. 2B, two fly back boosters 36 are connected together to launch upper stage(s) and payload 34. In FIG. 2C, three fly back boosters 36 are connected together to launch a bigger package of upper stage(s) and payload 34 than the one shown in FIG. 2B. In FIG. 2D, four fly back boosters 36 are connected to form a launch system, and in FIG. 2E, five fly back boosters 36 are connected together to launch a package of upper stage(s) and payload 34. Similarly but not shown in the figures, fly back boosters with scissors wings can also form different launch configurations by connecting with other kinds of vehicles.

In sum, comparing with fly back boosters having fixed sweep angle fixed wings, fly back boosters having scissors wings are much more flexible in forming different launch configurations by connecting with other fly back boosters and/or other vehicles. Fly back boosters with scissors wings are also more efficient during return flight and landing, resulting in smaller return engine(s), lower fuel consumption, lighter landing gears, and shorter runway requirement than fly back boosters with fixed sweep angle fixed wings. Comparing with fly back boosters with foldable fixed sweep angle fixed wings, fly back boosters with scissors wings are more stable and easier to control during staging and return flight because they do not need to unfold wings while flying in the air, they also have the advantages of having smaller engine(s), lower fuel consumption, lighter landing gears, and shorter runway requirement. Comparing with fly back boosters having variable oblique wings, fly back boosters with scissors wings are more stable and easier to control during its return flight because they do not need to deal with the stability and control problems caused by oblique wings.

Reusable Launch Vehicle

FIG. 6A to FIG. 6E show the preferred embodiment of a reusable launch vehicle according to the invention. Shown in FIG. 6A, reusable launch vehicle 46 is lifting off with the help of two fly back boosters 36 connecting to it. Reusable launch vehicle 46 has its upper scissors wing 24 installed on the back of its fuselage 22 and its lower scissors wing 26 installed at the belly of its fuselage 22. It also has a pair of control surfaces 30 and a rocket engine whose nozzle 32 can be seen in the figure. The scissors wings of all the three vehicles are yawed to be generally parallel with the longitudinal axes of their fuselages. The three vehicles use their connection/separation assemblies 28 to get connected together. Holding device(s) in addition to the pivots or hollow turrets for mounting the main wings can be installed on fuselage 22 to help hold secure both of the main wings when the reusable launch vehicle is conducting vertical launch. However, the holding device(s) is not shown in the figures of reusable launch vehicles because a reusable launch vehicle may or may not need holding device(s).

Figure 6A:
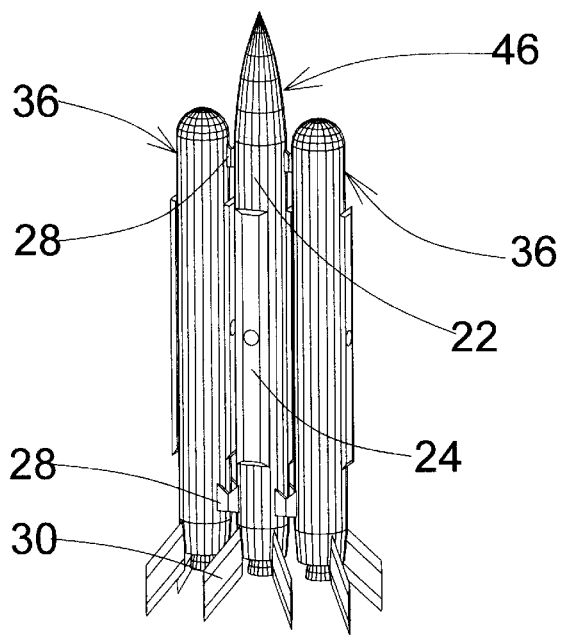
FIG. 6A shows a perspective view of a reusable launch vehicle whose main wings are yawed to be generally parallel with the longitudinal axis of its fuselage at vertical launch position and the reusable launch vehicle-is connected with two fly back boosters.
Figure 6B:
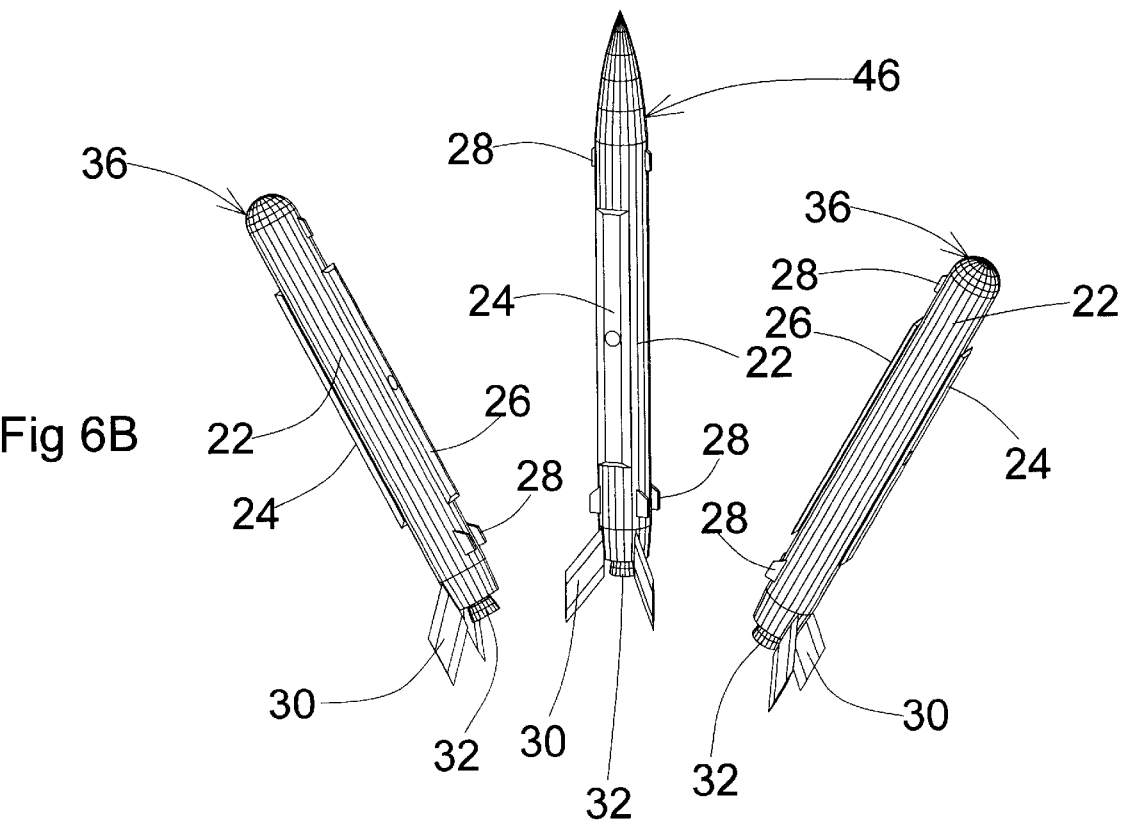
FIG. 6B shows a perspective view of the reusable launch vehicle shown in FIG. 6A during its flying toward Earth orbit when both of its fly back boosters are separating from it.

In FIG. 6B, two fly back boosters 36 are separating from reusable launch vehicle 46 to start their return flights. Reusable launch vehicle 46 continues its flight toward Earth orbit.

Figure 6C:
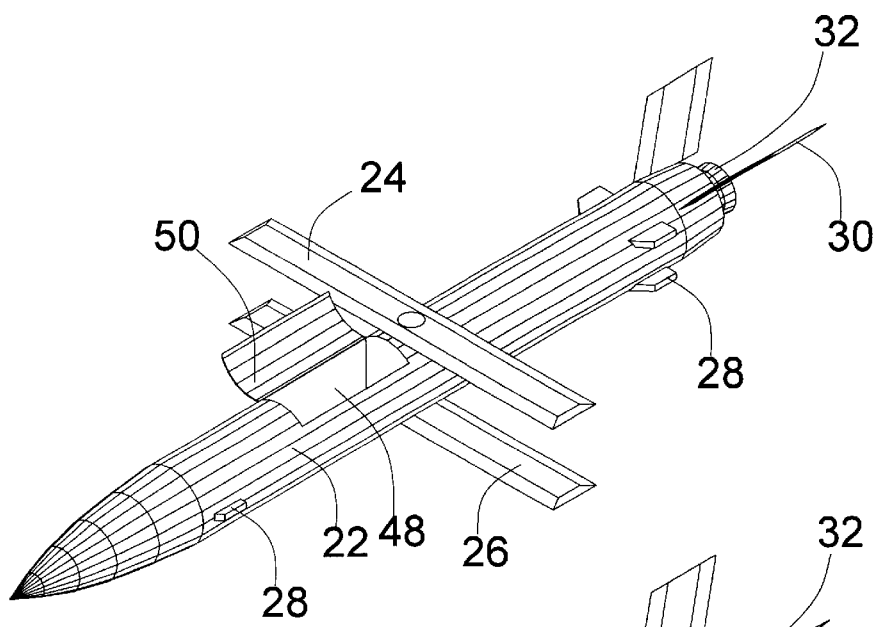
FIG. 6C hows a perspective view of the reusable launch vehicle shown in FIG. 6A at Earth orbit with its cargo bay door opened.

FIG. 6C indicates how the reusable launch vehicle operates at Earth orbit. As shown in the figure, cargo bay door 50 is opened to facilitate the releasing payload from and/or loading payload to cargo bay 48.

Figure 6D:
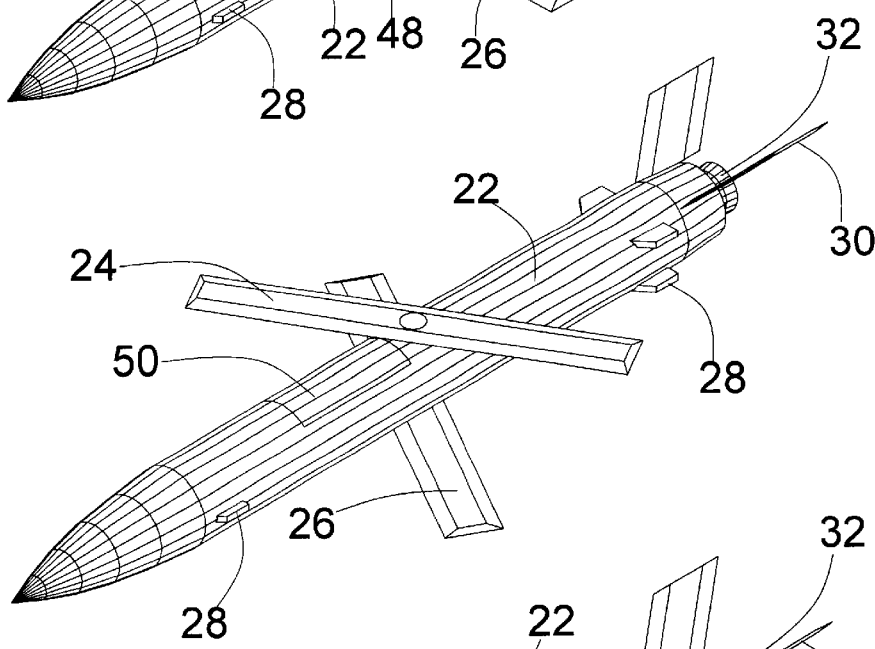
FIG. 6D shows a perspective view of the reusable launch vehicle shown in FIG. 6A flying in the air during its return flight from the Earth orbit with both of its main wings yawed to an angle to gain the optimum aerodynamic characteristic for the return flight.

In FIG. 6D, the reusable launch vehicle is flying in the air during its return flight after it finishes its orbital fight and reentering the atmosphere. Both of its upper main wing 24 and lower main wing 26 can either be yawed to maximize lift-to-drag ratio (L/D) to facilitate an efficient return flight or be yawed to form a high drag configuration to help the reusable launch vehicle slow down from the high speed of reentering the atmosphere.

Figure 6E:
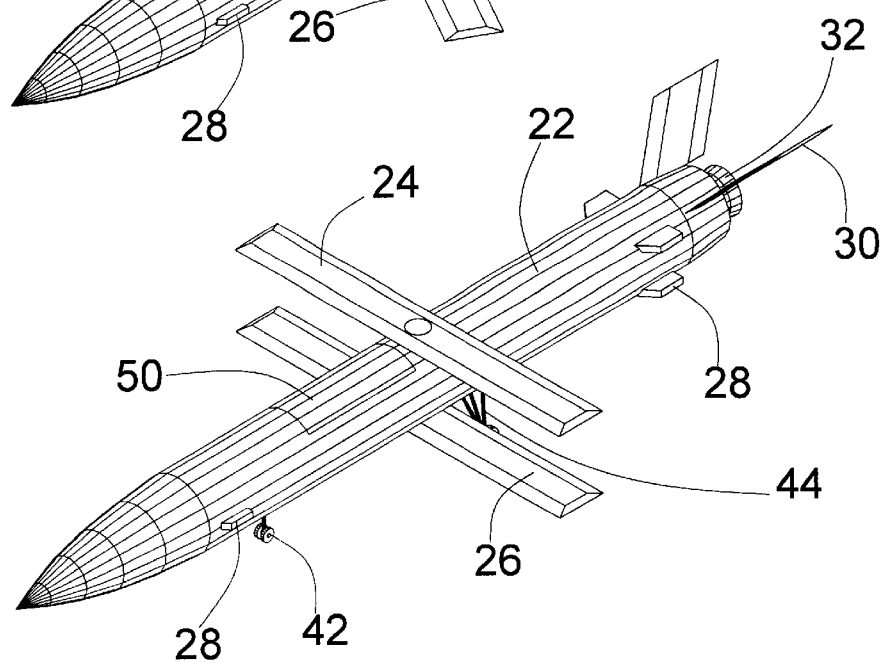
FIG. 6E shows a perspective view of the reusable launch vehicle shown in FIG. 6A ready for landing during its return flight from the Earth orbit with its landing gears stretched out and both of its main wings yawed to be generally perpendicular to the longitudinal axis of its fuselage.

In FIG. 6E, the reusable launch vehicle is ready for landing at the end of its return flight. Its landing gears 42 and 44 are stretched out and its main wings 24 and 26 are yawed to form an aerodynamic configuration similar to a biplane to reach a low landing speed.

Comparing with vertical launch reusable launch vehicles having fixed sweep angle fixed wings, vertical launch reusable launch vehicles with scissors wings are more flexible in forming different launch configurations by connecting with other vehicles, are more efficient and capable flying in the air during return flight, and have better landing performance.

Aerospace Plane

Figure 12A:
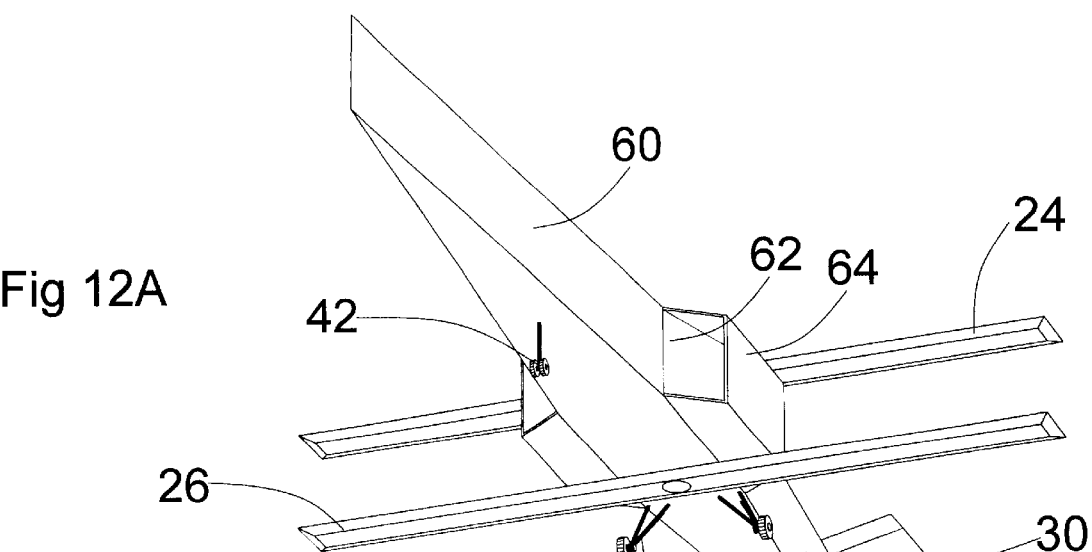
FIG. 12A shows a parallel view of an aerospace plane taking off from runway with its landing gears stretched out and both of its main wings yawed to be generally perpendicular to the longitudinal axis of its fuselage.

FIG. 12A to FIG. 12F show the preferred embodiment of an aerospace plane based on the invention. In FIG. 12A, the aerospace plane is taking off from runway. As shown in the figure, its upper main wing 24 is installed at its back and lower main wing 26 is installed beneath its belly. Two sets of engine systems are installed at around the middle portion of the right and left side of its fuselage. Each set of engine system has Air (Core-Enhanced) Turbo Ramjet(s), or AceTR(s) 62 and Ramjet(s)/Scramjet(s) 64. Both the right and left side of the aerospace plane's front fuselage become Highly Integrated 2-D Inlets 60 for the engine systems and both the right and left side of its rear fuselage become Highly Integrated Single-Expansion-Ramp-Nozzles or Highly Integrated SERNs 66. Two control surfaces 30 are installed at the end of the fuselage. Also as shown in the figure, both main wings 24 and 26 are yawed to be generally perpendicular to the longitudinal axis of the aerospace plane's fuselage, forming a configuration similar to a biplane, and landing gears 42 and 44 are stretched out. This biplane-like configuration have high lift-to-drag ratio (L/D) at low speed and can make the aerospace plane take-off at low speed with low engine thrust after a short take-off run.

Figure 12B:
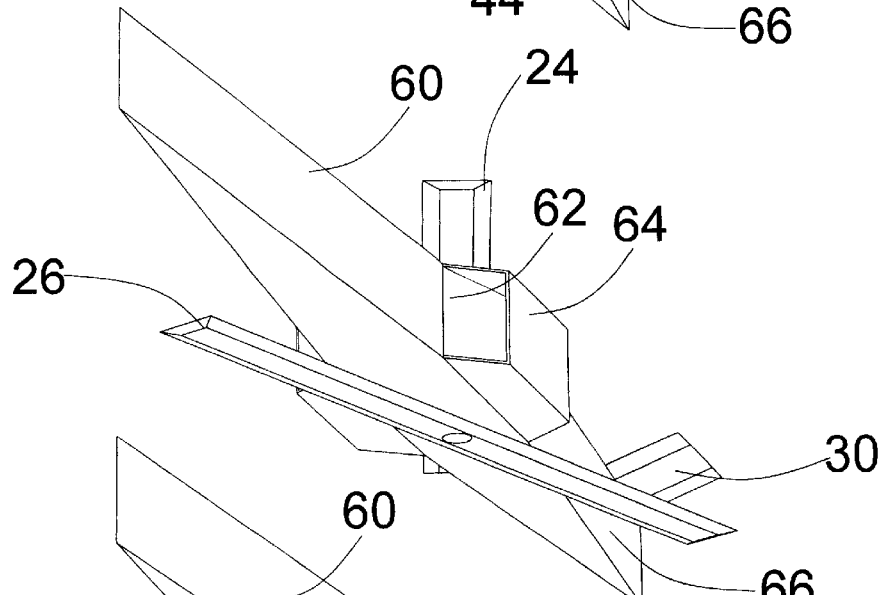
FIG. 12B shows a parallel view of the aerospace plane shown in FIG. 12A climbing and accelerating in the air with both of its main wings yawed to an angle to maximize its lift-to-drag ratio (L/D).

In FIG. 12B, the aerospace plane is climbing and accelerating in the air after the takeoff. In order to reach its cruising altitude and hypersonic speed, the aerospace plane must climb and accelerate through subsonic, transonic, and supersonic speed. Scissors wings can make the aerospace plane maximize its lift-to-drag ratio (L/D) during almost the entire course of the climb and acceleration by adjusting the yaw angle of both of the main wings. This maximization of lift-to-drag ratio (L/D) can make the aerospace plane climb and accelerate with lower engine thrust thus lighter AceTR(s) 62 and lower fuel consumption than aerospace planes like X-43 and HyperSoar.

Figure 12C:
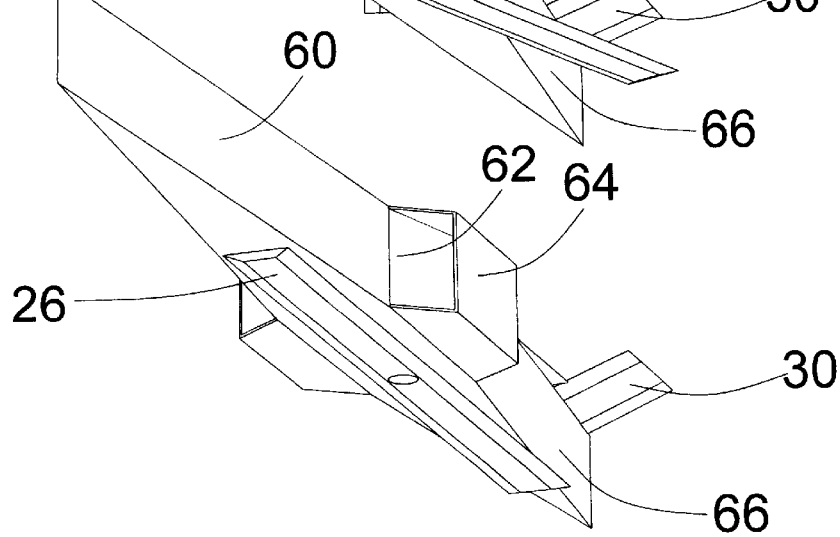
FIG. 12C shows a parallel view of the aerospace plane shown in FIG. 12A flying at a hypersonic speed with both of its main wings yawed to be generally parallel with the longitudinal axis of its fuselage.

In FIG. 12C, the aerospace plane has reached its cruising altitude and flying at hypersonic speed. Both main wing 24 and 26 are yawed to be generally parallel with the longitudinal axis of the aerospace plane's fuselage. While flying at hypersonic speed, the aerospace plane can use its fuselage, and/or one or two of the main wings, and/or additional low aspect ratio wings (not shown in the figures) to generate lift. The aerospace plane can also accelerate to Earth orbit under this configuration. Holding device(s) in addition to the pivots or hollow turrets for mounting the main wings can be installed on the fuselage to help hold secure both of the main wings during hypersonic cruise. However, the holding device(s) is not shown in all the figures of aerospace plane because an aerospace plane may or may not need holding device(s).

Figure 12D:
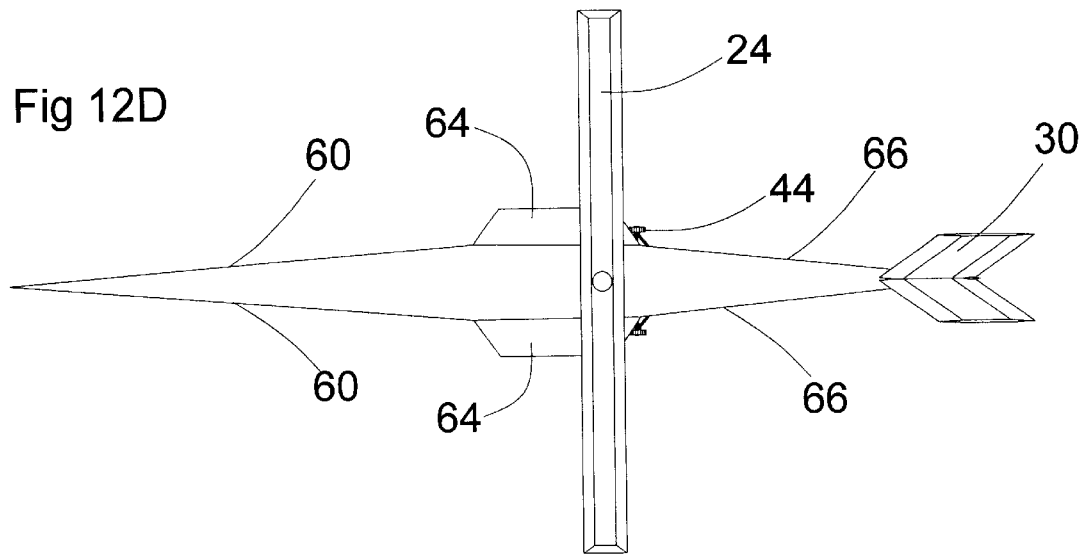
FIG. 12D shows a top plan view of the aerospace plane shown in FIG. 12A taking off from runway with its landing gears stretched out and both of its main wings yawed to be generally perpendicular to the longitudinal axis of its fuselage.
Figure 12E:
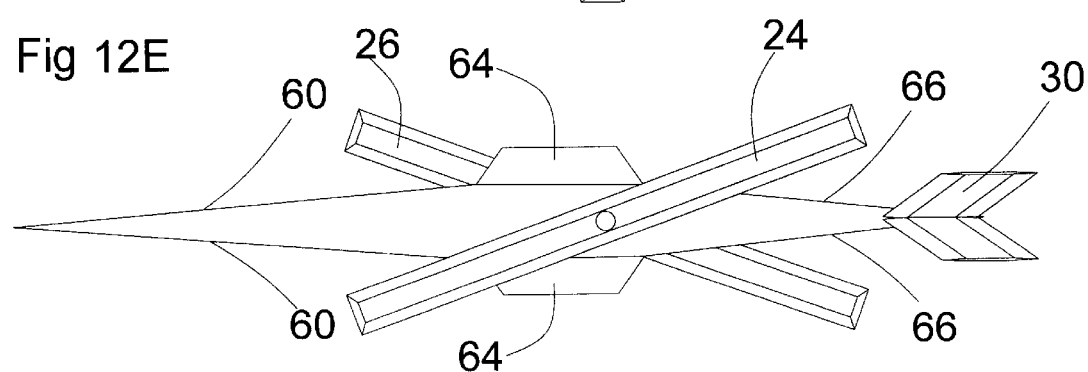
FIG. 12E shows a top plan view of the aerospace plane shown in FIG. 12A climbing and accelerating in the air with both of its main wings yawed to an angle to maximize its lift-to-drag ratio (L/D).
Figure 12F:
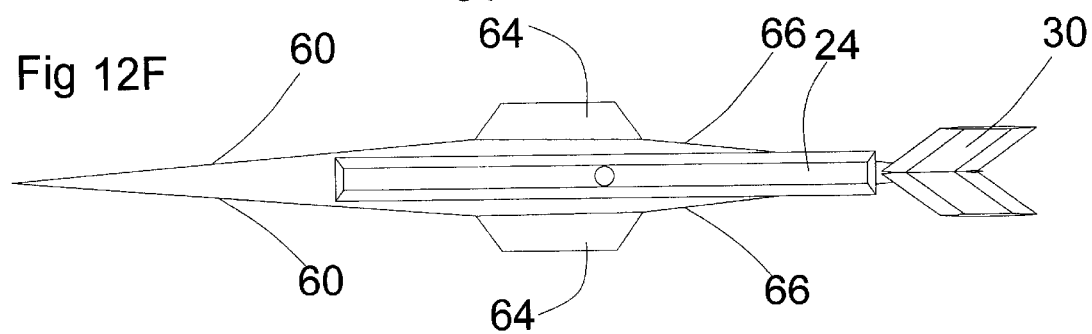
FIG. 12F shows a top plan view of the aerospace plane shown in FIG. 12A flying at a hypersonic speed with both of its main wings yawed to be generally parallel with the longitudinal axis of its fuselage.

In order to clearly present the preferred embodiment, FIG. 12D to FIG. 12F show top plan views of the aerospace plane at take-off, climb and acceleration, and hypersonic flying. In FIG. 12D, it is at take-off configuration with both of its main wings yawed to be generally perpendicular to its fuselage and its landing gears 44 and 42 stretched out. Ramjets/ Scramjets 64 can be seen installed at both the right and left side of its fuselage. The aerospace plane's fore fuselage forms two Highly Integrated 2-D Inlets 60, and its rear fuselage forms two Highly Integrated SERNs 66. Control surfaces 30 are installed at the end of its fuselage.

In FIG. 12E, the aerospace plane is climbing and accelerating in the air after its takeoff. Both main wing 24 and 26 are yawed to maximize the lift-to-drag ratio (L/D) during the climbing and acceleration.

FIG. 12F shows the aerospace flying at a hypersonic speed. Both main wings are yawed to be generally parallel with the longitudinal axis of the fuselage and upper main wing 24 can be seen in the figure.

The aerospace plane can form a configuration similar to the biplane-like shape shown in both FIG. 12A and FIG. 12D to achieve excellent landing performance because the biplane-like configuration can achieve low approach speed and have excellent low speed performance. The low approach speed also reduces the weight and complexity of landing gears because it causes low impact load and reduces requirements for landing gear breaks.

Comparing with the low aspect ratio configurations of aerospace planes like X-43 and HyperSoar, aerospace planes with scissors wings can reduce weight by having smaller engine(s) and consume less fuel during take-off and flying at subsonic, transonic, and supersonic speed, and by having lighter and simpler landing gears. These saved weights can help aerospace planes have longer range and/or more payload. In addition, they also have much better take-off and landing performance that increases their flexibility in conducting different missions.

Alternative Embodiments
Fly Back Booster

Figure 3A:
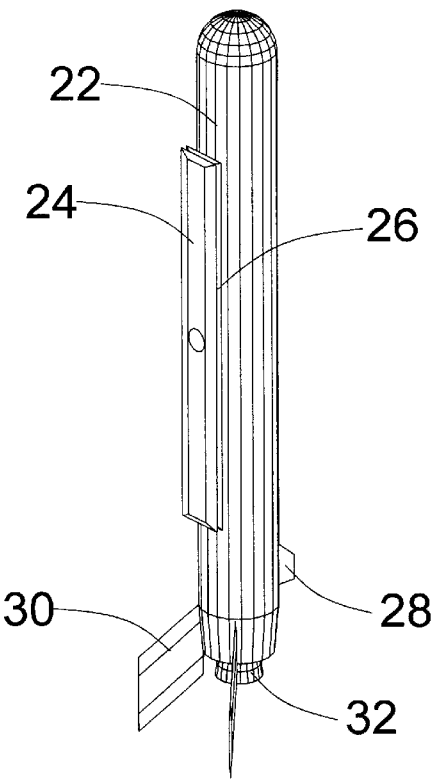
FIG. 3A hows a perspective view of a fly back booster whose two main wings are mounted on the back of its fuselage and are yawed to be generally parallel with the longitudinal axis of its fuselage at vertical launch position.
Figure 3B:
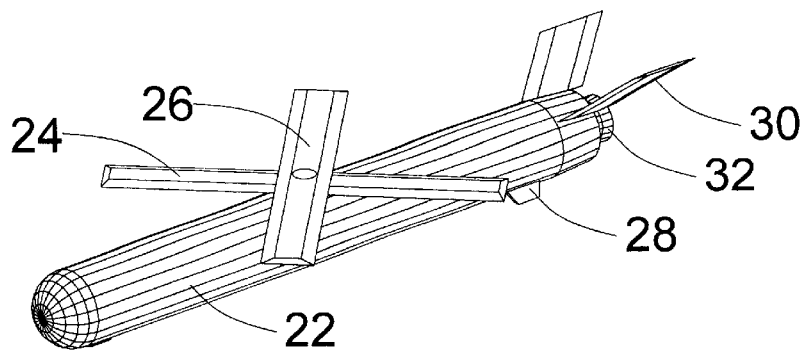
FIG. 3B shows a perspective view of the fly back booster shown in FIG. 3A flying in the air during its return flight with both of its main wings yawed to an angle to maximize its-to-drag ratio (L/D).
Figure 3C:
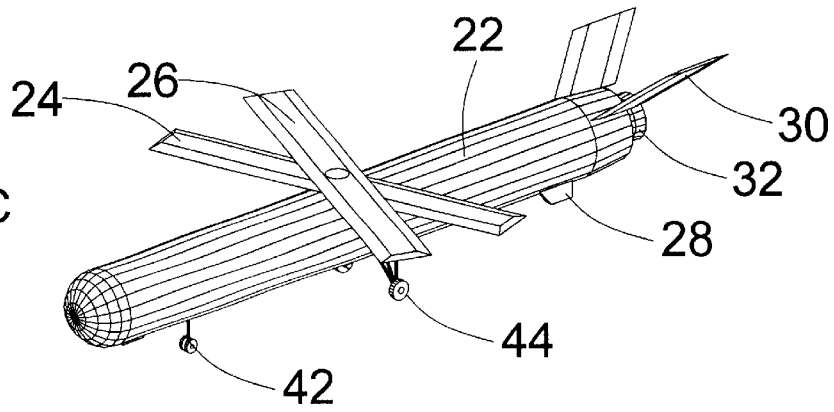
FIG. 3C shows a perspective view of the fly back booster shown in FIG. 3A ready for landing during its return flight with its landing gears stretched out and both of its main wings yawed to a small angle to form a high-aspect-ratio configuration.

FIG. 3A to FIG. 3C show one alternative embodiment of fly back booster having scissors wings. According to this embodiment, both upper main wing 24 and lower main wing 26 are installed at one side of fuselage 22. They can either be mounted at the back of fuselage 22 or at the belly of fuselage 22. Shown in these three figures, both of the main wings are installed at the back of the fuselage. In FIG. 3A, a fly back booster is at vertical launch position with both of the main wings yawed to be generally parallel with the longitudinal axis of the fuselage with upper main wing 24 being above lower main wing 26. In FIG. 3B, the fly back booster is flying in the air during its return flight with its main wing 24 and 26 being adjusted to maximize its lift-to-drag ratio (L/D). In FIG. 3C, the fly back booster is ready for landing. Both of the main wings are yawed to have a small yaw angle to form a high aspect ratio configuration to reduce landing speed. Landing gears 42 and 44 are stretched out for the landing.

FIG. 4A to FIG. 4C show another alternative embodiment of fly back booster having scissors wings. In this embodiment, both upper main wing 24 and lower main wing 26 are installed at one side of fuselage 22 and they can form a single wing by dropping their leading and trailing edge flaps and/or flaperons. They can either be both mounted at the back of the fuselage or at the belly of the fuselage. Shown in these three figures, both of the main wings are installed at the back of the fuselage. FIG. 4A and FIG. 4B show the fly back booster at vertical launch position and during return flight, respectively. FIG. 4C shows what differs from the previous embodiment of FIG. 3C. When flying at low speed and during landing, the fly back booster can have both its upper main wing 24 and lower main wing 26 yawed to be generally perpendicular to the longitudinal axis of fuselage 22. Both of the main wings can form a single wing by dropping their leading and trailing edge flaps and/or flaperons. As shown in FIG. 4C, leading edge flaps 38 of upper main wing 24 are dropped at a bigger angle so that it can attach leading edge flaps 39 of lower main wing 26 that are dropped at a smaller angle. Similarly, trailing edge flaperons 40 of upper main wing 24 are dropped at a bigger angle to touch trailing edge flaperons 41 of lower main wing 26 that are dropped at a smaller angle. By this way, both of the main wings form a single wing to maximize the fly back booster's aerodynamic performance at low speed flying and landing.

Figure 5A:
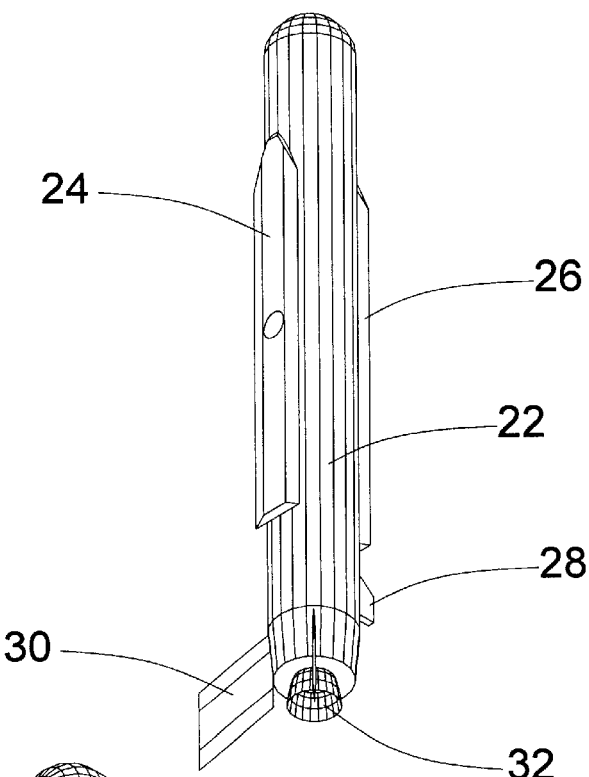
FIG. 5A shows a parallel view of a fly back booster whose main wings are asymmetric and are yawed to be generally parallel with the longitudinal axis of its fuselage at vertical launch position.
Figure 5B:
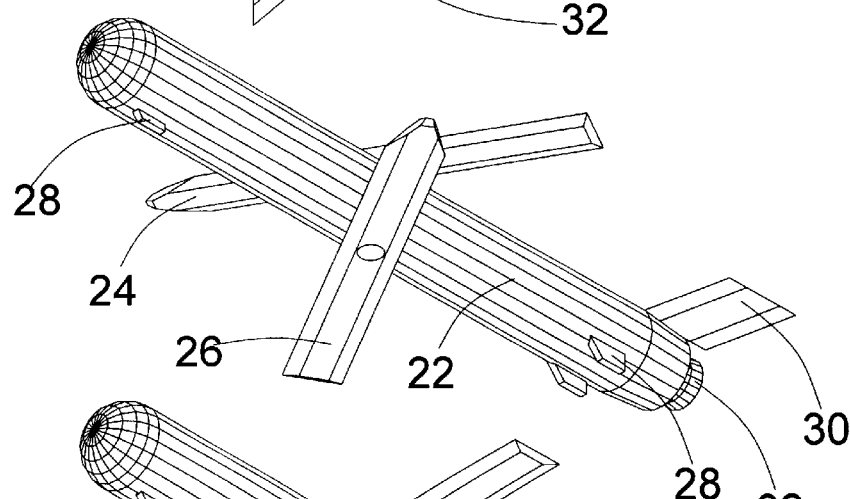
FIG. 5B shows a parallel view of the fly back booster shown in FIG. 5A flying in the air during its return flight with both of its asymmetric main wings yawed to an angle to maximize its lift-to-drag ratio (L/D).
Figure 5C:
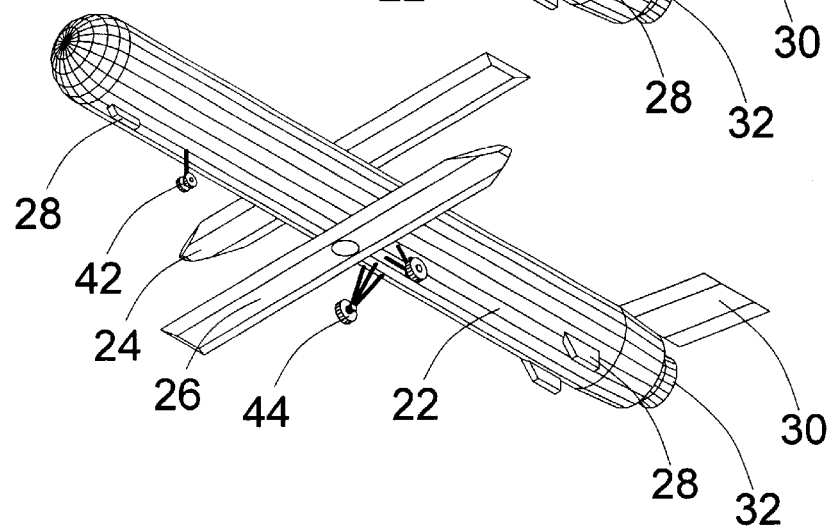
FIG. 5C shows a parallel view of the fly back booster shown in FIG. 5A ready for landing during its return flight with its landing gears stretched out and both of its asymmetric main wings yawed to be generally perpendicular to the longitudinal axis of its fuselage.

FIG. 5A to FIG. 5C show the third alternative embodiment of fly back booster having scissors wings. In this embodiment, both upper main wing 24 and lower main wing 26 are asymmetric. The asymmetry refers to each main wing has two different half wings in terms of different plane shapes, different wingtips, different airfoils, different length, different lift-generating devices, and/or different control surfaces, etc. According to this embodiment, the upper main wing and lower main wing can either be both installed on one side of fuselage 22 or with the upper main wing being installed at the back of the fuselage and lower main wing installed at the belly of the fuselage. FIG. 5A shows a fly back booster having asymmetric main wings at vertical launch position. As indicated in the figure, upper main wing 24 is mounted at the back of fuselage 22 and lower main wing 26 is installed at the belly of fuselage 22. The asymmetry of the main wings in this figure can be seen from the two different wingtips of upper main wing 24. FIG. 5B and FIG. 5C show the fly back booster flies in the air during its return flight and gets ready for landing, respectively. These two figures indicate that although each asymmetric main wing might generate asymmetric lift, both of the two main wings work together to generate symmetric lift along the longitudinal axis of the fuselage no matter what their yaw angle is.

Reusable Launch Vehicle

One alternative embodiment of reusable launch vehicle with scissors wings is the reusable launch vehicle that can be carried to reach an altitude and speed in the air and then launched in the mid-air as shown in FIG. 7A to FIG. 7H.

Figure 7A:
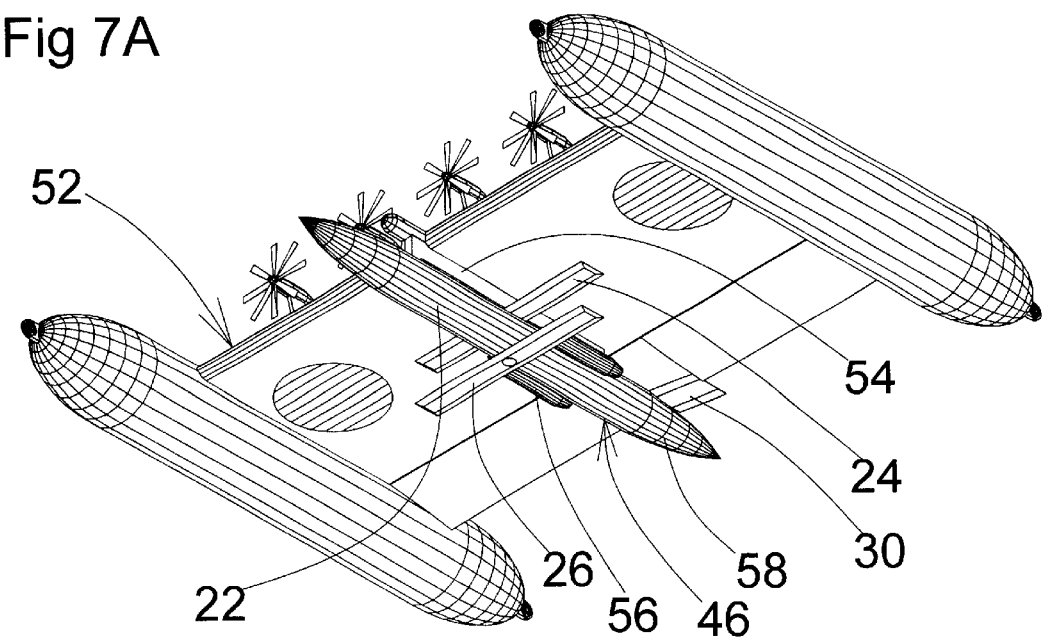
FIG. 7A shows a parallel view of a reusable launch vehicle flying in the air just after it is separated from the aircraft carrying it.
Figure 7B:
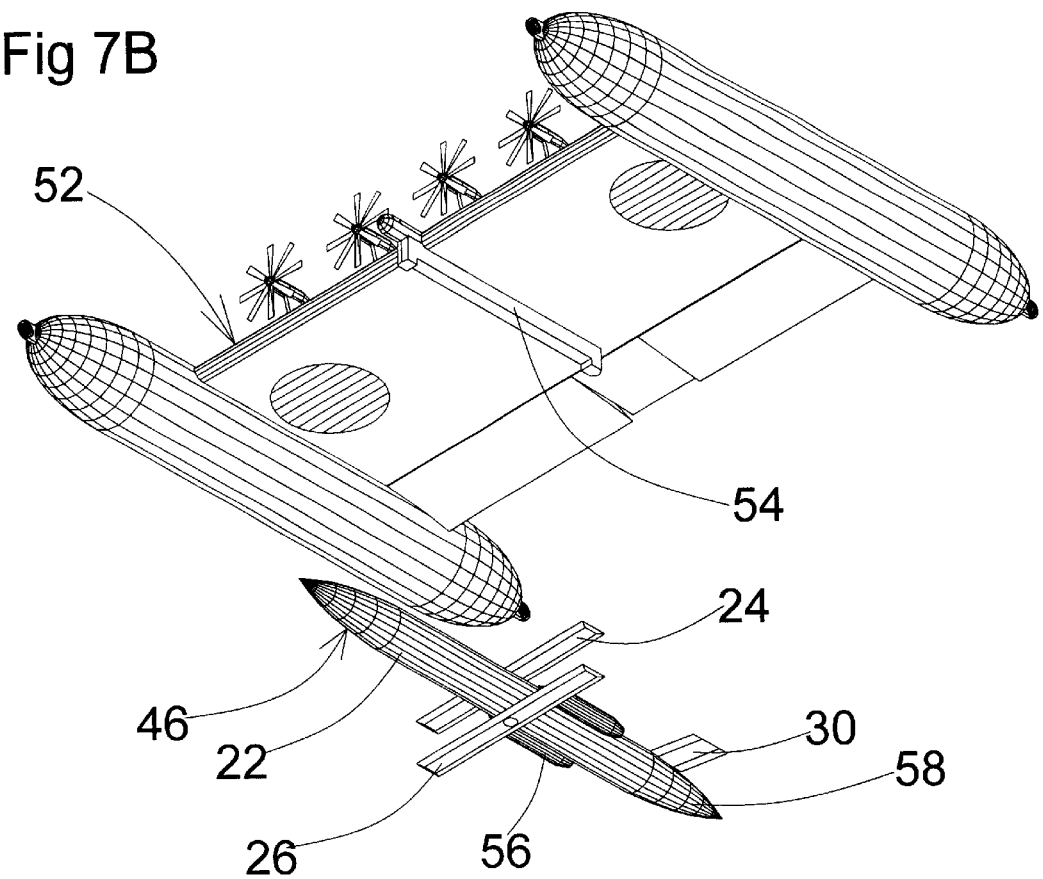
FIG. 7C shows a parallel view of the reusable launch vehicle shown in FIG. 7A climbing and accelerating in the air on its air-breathing engines with both of its main wings yawed to an angle to maximize its lift-to-drag ratio (L/D).
FIG. 7D shows a parallel view of the reusable launch vehicle shown in FIG. 7A ready to ignite its rocket engine with its tail fairing being removed.
FIG. 7E shows a parallel view of the reusable launch vehicle shown in FIG. 7A climbing and accelerating toward Earth orbit powered by its rocket engine.
FIG. 7F shows a perspective view of the reusable launch vehicle shown in FIG. 7A at Earth orbit with its cargo bay door opened.
FIG. 7G shows a perspective view of the reusable launch vehicle shown in FIG. 7A flying in the air during its return flight from the Earth orbit after reentering the atmosphere with both of its main wings yawed to an angle to gain the optimum aerodynamic characteristic for the return flight.
FIG. 7H shows a perspective view of the reusable launch vehicle shown in FIG. 7A ready for landing during its return flight from the Earth orbit with its landing gears stretched out and both of its main wings yawed to be generally perpendicular to the longitudinal axis of its fuselage.

Shown in FIG. 7A, reusable launch vehicle 46 has just separated from the aircraft (not shown in the figure) that carried it in the air. Although the reusable launch vehicle shown in the figure has two air-breathing engines 56, air-breathing engine is not a must for the reusable launch vehicle because it can also fly to Earth orbits only with rocket engines(s). As shown in the figure, the reusable launch vehicle also has a tail fairing 58 covering its rocket engine nozzle to reduce drag. Its upper main wing 24 is installed above fuselage 22 and lower main wing 26 is mounted beneath the fuselage.

Figure 7C:
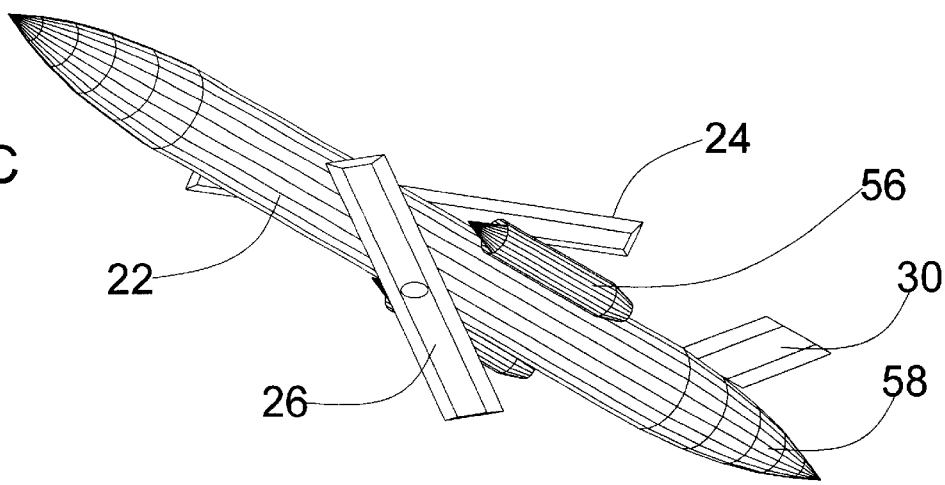

FIG. 7C shows the reusable launch vehicle climbing and accelerating in the air powered by air-breathing engines 56 after the separation. The reusable launch vehicle can maximize its lift-to-drag ratio (L/D) during its climbing and acceleration through subsonic, transonic, and supersonic speed by adjusting the yaw angle of both of its main wings.

Figure 7D:
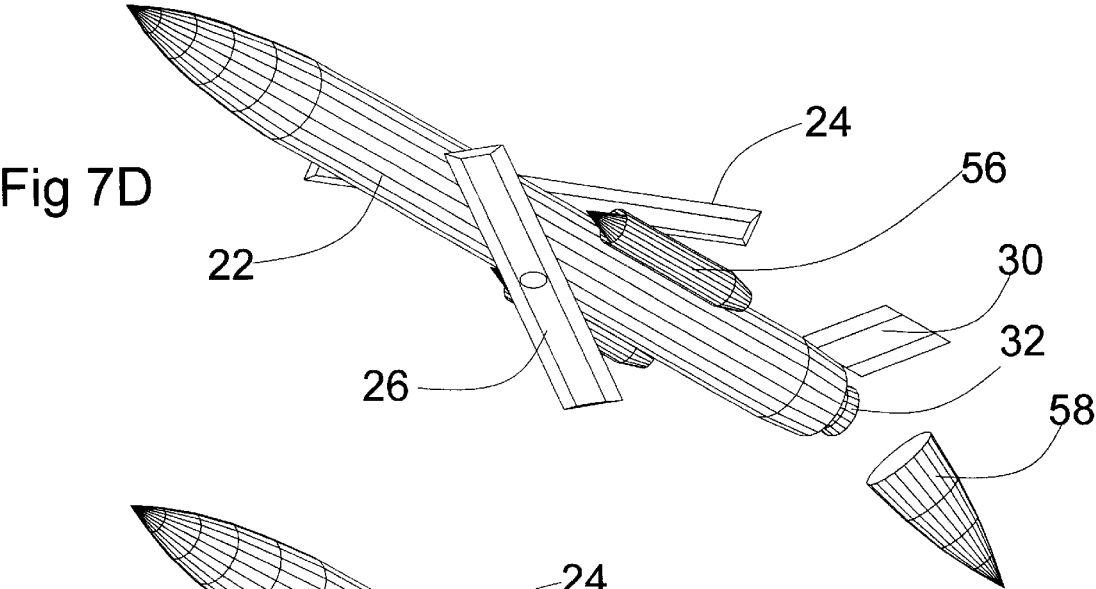

In FIG. 7D, the reusable launch vehicle has reached a high altitude and speed in the air and is removing its tail fairing 58 to ignite its rocket engine. Rocket engine nozzle 32 can be seen at the tail of fuselage 22.

Figure 7E:
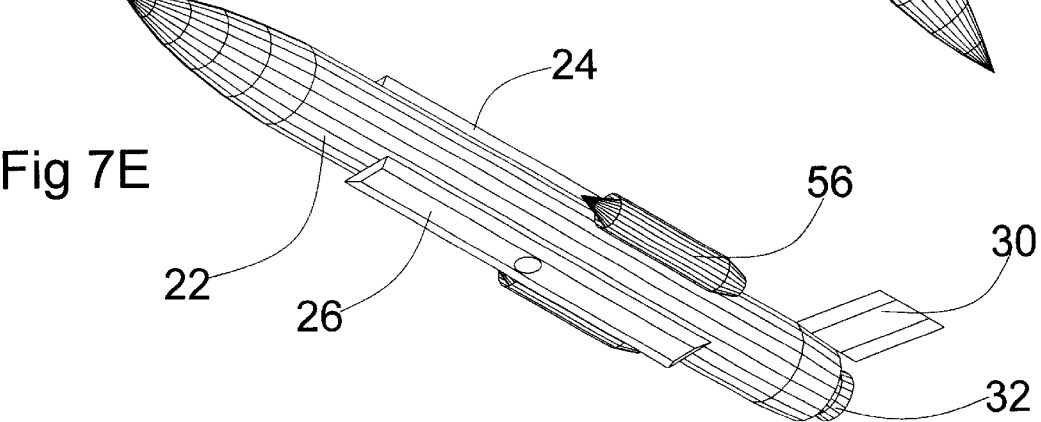

In FIG. 7E, the reusable launch vehicle is flying toward Earth orbit on its rocket engine. The yaw angle of both upper main wing 24 and lower main wing 26 can still be adjusted to maximize lift-to-drag ratio (L/D) while the reusable launch vehicle is flying in the air on rocket engine.

Figure 7F:
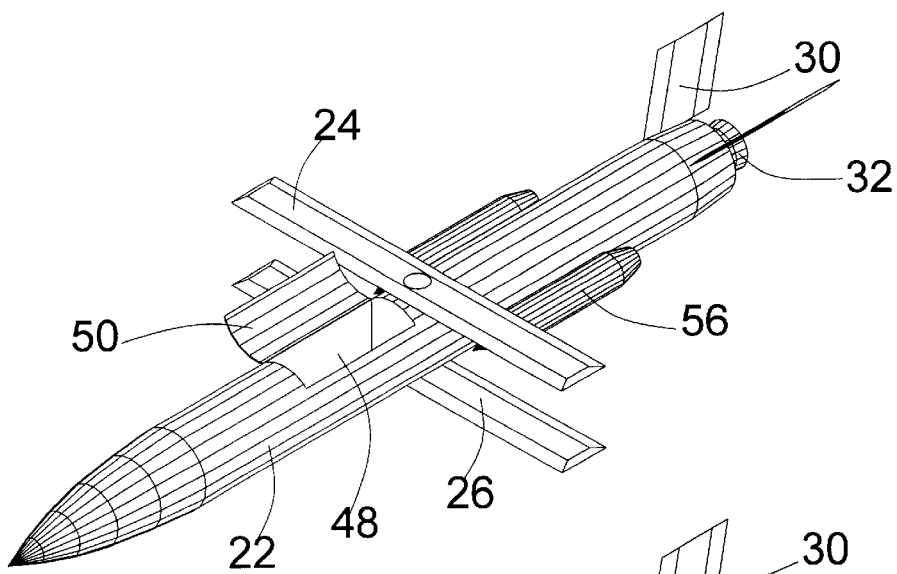

FIG. 7F shows the reusable launch vehicle operates at Earth orbit. Its cargo bay door 50 is open so that payload can be released from or loaded to cargo bay 48.

Figure 7G:
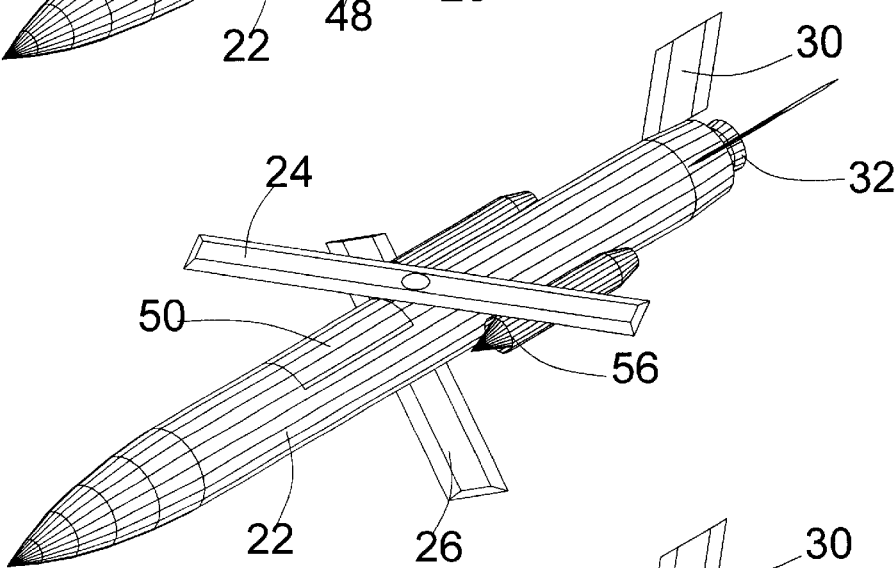

FIG. 7G indicates how the reusable launch vehicle flies back during its return flight after reentering the atmosphere. The yaw angle of its main wings can be adjusted so that it can either form a high drag configuration to reduce the high speed caused by the reentering, or can maximize its lift-to-drag ratio (L/D) to increase its flexibility to fly to different landing sites at different locations.

Figure 7H:
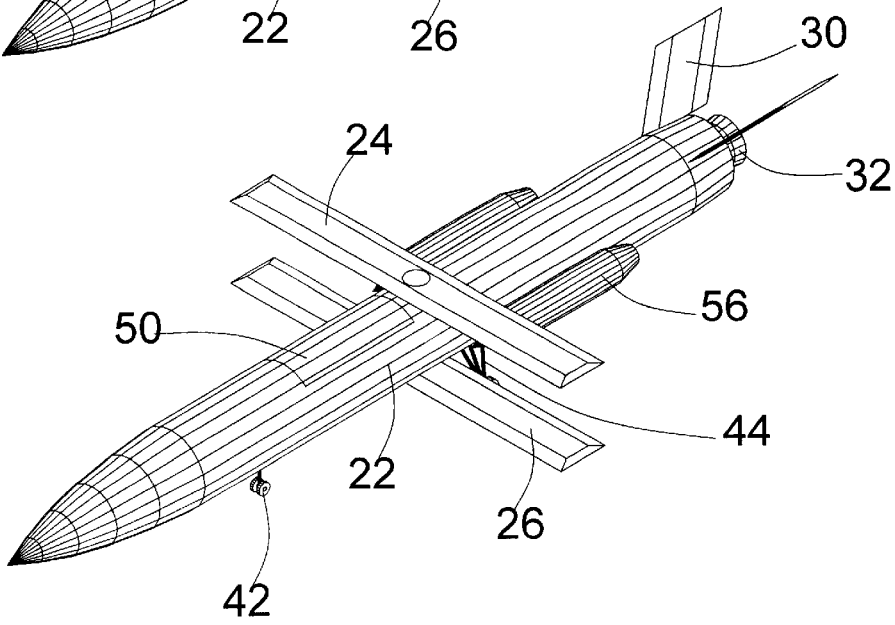

In FIG. 7H, the reusable launch vehicle is ready for landing. Its main wings form a configuration similar to biplanes to reduce landing speed, and its landing gears 42 and 44 are stretched out.

Comparing with other air-launch reusable launch vehicles having fixed sweep angle fixed wings, reusable launch vehicles with scissors wings can save weight by having smaller power plants and consuming less fuel during the climb and acceleration in the air after separation. This is because the scissors wings can maximize lift-to-drag ratio (L/D) at a wide range of speed. Reusable launch vehicles with scissors wings are also easier to separate from the aircraft carrying them because their scissors wings can be adjusted to make their aerodynamic charac teristics optimized for the separation at a wide range of speed. They are also more flexible and efficient during return flight and landing and can save weight by having lighter landing gears.

Another embodiment is a reusable launch vehicle that takes off horizontally like an aircraft or glider. FIG. 8A to FIG. 8D show details of this embodiment.

FIG. 8A shows a reusable launch vehicle taking off from runway. It has two air-breathing engines 56 to power its take-off and flying in the air, and its main wings form a biplane-like configuration to make it take-off at low speed after a short take-off run. Its tail fairing 58 is used to reduce drag by covering its rocket engine nozzle. This figure indicates a reusable launch vehicle uses its own power to take-off like an aircraft. A reusable launch vehicle of this embodiment can also take-off like a glider towed by an aircraft and thus may or may not need air-breathing engines (s).

In FIG. 8B, the reusable launch vehicle is climbing and accelerating in the air powered by its air-breathing engines 56. Its main wings can maximize its lift-to-drag ratio (L/D) from subsonic to supersonic, making it efficient in the climb and acceleration. After it reached a certain altitude an d speed, its tail fairing 58 is removed and rocket engine ignited, as shown in FIG. 8C.

FIG. 8D shows the reusable launch vehicle further accelerates while flying toward Earth orbit on its rocket engine. Both upper main wing 24 and lower main wing 26 can still adjust their yaw angle to maximize lift-to-drag ratio while the reusable launch vehicle is flying in the air on its rocket engine.

The orbital flying, return flight, and landing of this reusable launch vehicle is similar to the reusable launch vehicles that are carried to the air and launched in the mid-air.

Comparing with other horizontal take-off reusable launch vehicles with fixed sweep angle fixed wings, reusable launch vehicles with scissors wings can save weight by consuming less fuel in the air because they can maximize their lift-to-drag ratio from take-off to supersonic speed. Comparing with those having variable sweep wings, reusable launch vehicle with scissors wings have lighter structure because their main wings are continuous and the bending moments generated by each of the main wings are generally self-neutralized by each main wing. In contrast, variable sweep wings have to pass huge bending moments onto fuselage through their rotation hubs or pivots thus require stronger and heavier structures.

The following three alternative embodiments are about the installation locations and arrangements of the main wings of reusable launch vehicle with scissors wings. These different main wing locations and arrangements can be used on reusable launch vehicles that are launched vertically, that are carried to the air by an aircraft and launched in mid-air, and that can take-off horizontally like aircraft or gliders.

FIG. 9A to FIG. 9E show one alternative embodiment of the location and arrangement of main wings. Both main wings are located at one side of fuselage with one main wing over another. The main wings can either be both installed at the back of fuselage or at the belly of fuselage. In FIG. 9A, the reusable launch vehicle is taking off from runway either like an aircraft or a glider. Both its upper main wing 24 and lower main wing 26 are yawed to maximize its lift-to-drag ratio (L/D) for take-off. FIG. 9B shows both of the main wings keep adjusting their yaw angle to maximize the reusable launch vehicle's lift-to-drag ratio (L/D) during its climbing and acceleration in the air.

In FIG. 9C, it has removed its tail fairing and ignited its rocket engine to further accelerate into Earth orbit. Both of the main wings keep maximizing lift-to-drag ratio (L/D) while the reusable is flying in the air on its rocket engine. If the reusable launch vehicle is vertically launched, its main wings should be at the same position as shown in this figure but the reusable launch vehicle as a whole should be at vertical position instead of the position shown in the figure.

FIG. 9D shows the reusable launch vehicle operating at Earth orbit with its cargo bay door 50 opened. In FIG. 9E, it makes itself ready for landing at the end of return flight with both of its main wings being yawed to a small angle to form a high aspect ratio configuration and with its landing gears stretched out.

FIG. 10A to FIG. 10E show another alternative location and arrangement of main wings. The only difference between this embodiment the previous embodiment shown in FIG. 9A and FIG. 9E is that, both the upper main wing and lower main wing of this embodiment can form a single wing at low speed by dropping their leading and trailing edge flaps and flaperons.

FIG. 10A to FIG. 10E show a reusable launch vehicle at various flying conditions. In FIG. 10A, the reusable launch vehicle is taking off from runway with both upper main wing 24 and lower main wing 26 yawed to be generally perpendicular to the longitudinal axis of fuselage 22. As shown in the figure, leading edge flaps 38 of upper main wing 24 are dropped at a bigger angle than leading edge flaps 39 of lower main wing 26 so that leading edge flaps 38 can touch leading edge flaps 39. Similarly, trailing edge flaperons 40 of upper main wing 24 are dropped at a bigger angle than trailing edge flaperons 41 of lower main wing 26 so that trailing edge flaperons 40 can touch trailing edge flaperons 41. By this way, upper main wing 24 and lower main wing 26 form a single wing that has good aerodynamic characteristics at low speed.

FIG. 10B to FIG. 10D show the reusable launch vehicle accelerating in the air, flying toward Earth orbit, and operating at Earth orbit, respectively. FIG. 10E shows both of the main wings form the single straight wing again when the reusable launch vehicle is ready for landing.

FIG. 11A to FIG. 11E show the third alternative arrangement of scissors wings. In this embodiment, each of the main wings is asymmetric. The asymmetry on each main wing refers to each wing has two different half wings in terms of different plane shapes, different wingtips, different lengths, different airfoils, different lift-generating devices, and/or different control surfaces, etc. The main wings can be mounted both at one side of fuselage, or with one wing at the back and another at the belly of fuselage.

Figure 11A:
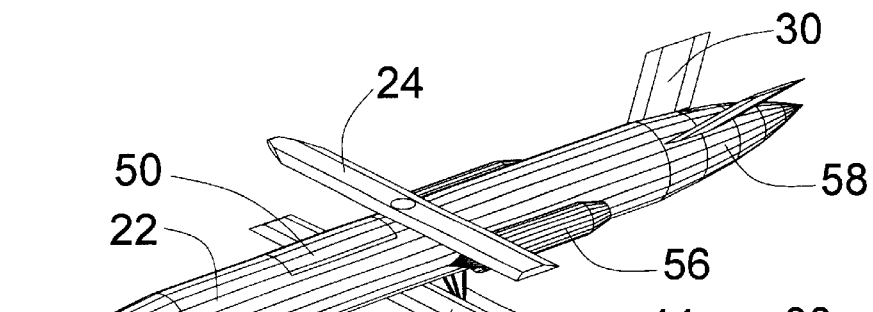
FIG. 11A shows a perspective view of a reusable launch vehicle that can take-off like an aircraft or glider taking off from runway with both of its asymmetric main wings yawed to be generally perpendicular to the longitudinal axis of its fuselage and with its landing gears stretched out.
Figure 11B:
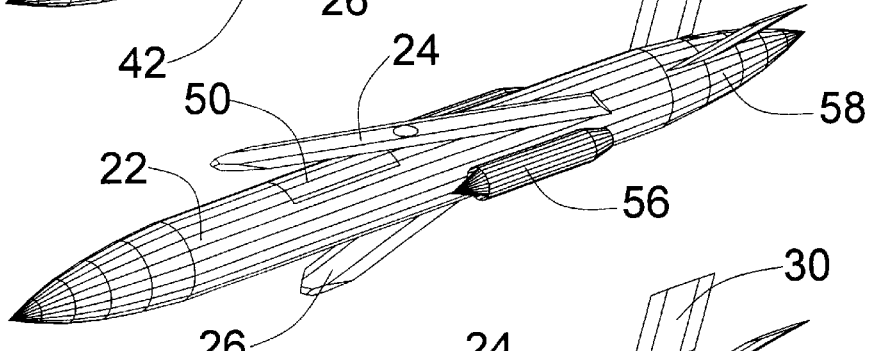
FIG. 11B shows a perspective view of the reusable launch vehicle shown in FIG. 11A climbing and accelerating in the air on its air-breathing engines and with both of its asymmetric main wings yawed to an angle to maximize its lift-to-drag ratio (L/D).
Figure 11C:
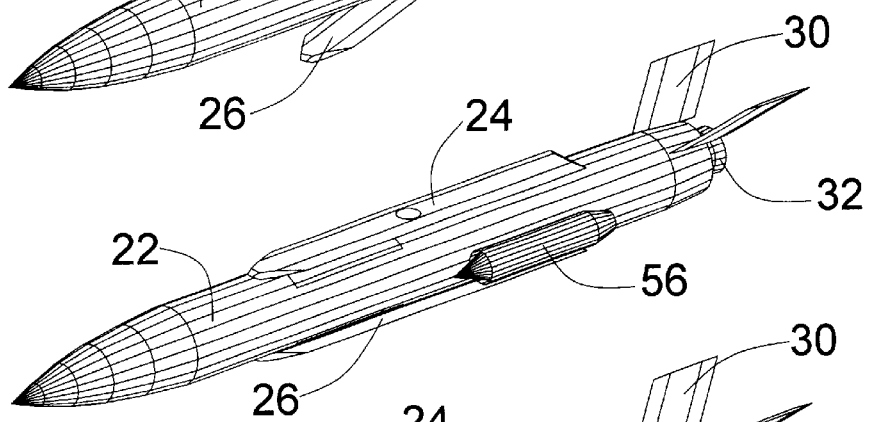
FIG. 11C shows a perspective view of the reusable launch vehicle shown in FIG. 11A climbing and accelerating toward Earth orbit on its rocket engine with its tail fairing removed.
Figure 11D:
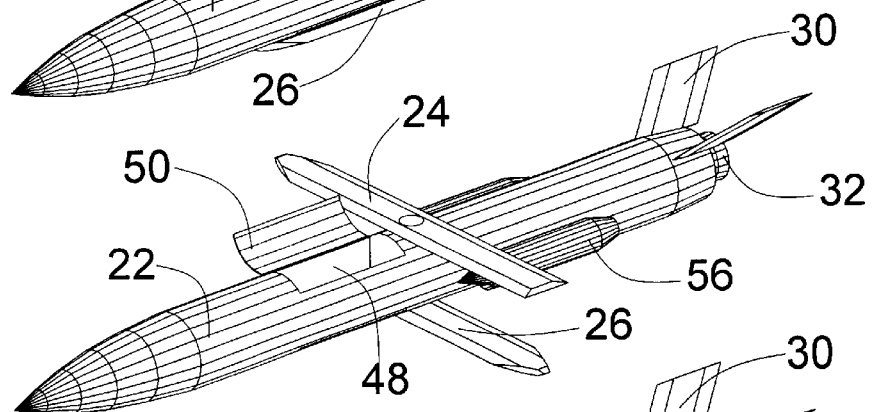
FIG. 11D shows a perspective view of the reusable launch vehicle shown in FIG. 11A at the Earth orbit with its cargo bay door opened.
Figure 11E:
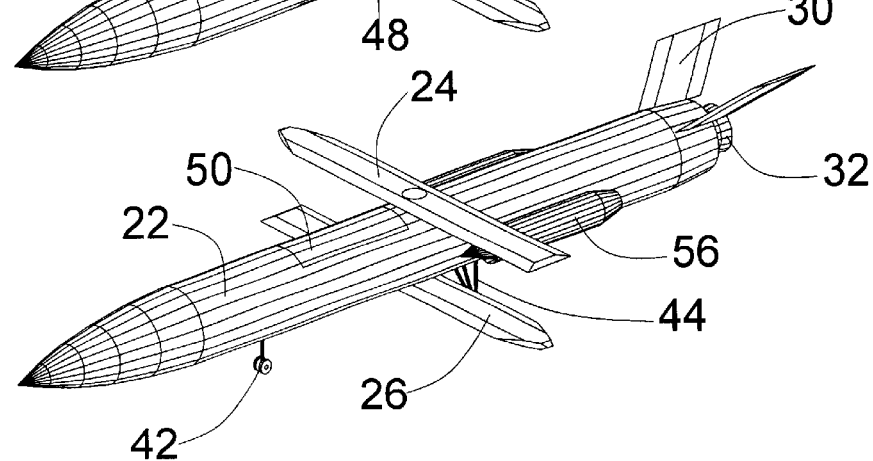
FIG. 11E shows a perspective view of the reusable launch vehicle shown in FIG. 11A ready for landing during its return flight from the Earth orbit with its landing gears stretched out and both of its asymmetric main wings yawed to be generally perpendicular to the longitudinal axis of its fuselage.

For example, shown in FIG. 11A to FIG. 11E is a reusable launch vehicle with different wingtips on each main wing. FIG. 11A and FIG. 11B show the reusable launch vehicle taking off like an aircraft or glider and flying at high speed respectively. FIG. 11C shows it accelerating toward Earth orbit on its rocket engine. In FIG. 11D, it is flying and operating at Earth orbit, and in FIG. 11E, it is ready for landing at the end of its return flight. Although each main wing can be asymmetric, the lift generated by both main wings can still be symmetric along the longitudinal axis of fuselage no matter what the yaw angle is. This feature can help both of the main wings have optimized shapes to maximize the flying performance of the reusable launch vehicle.

Aerospace Plane

Figure 13A:
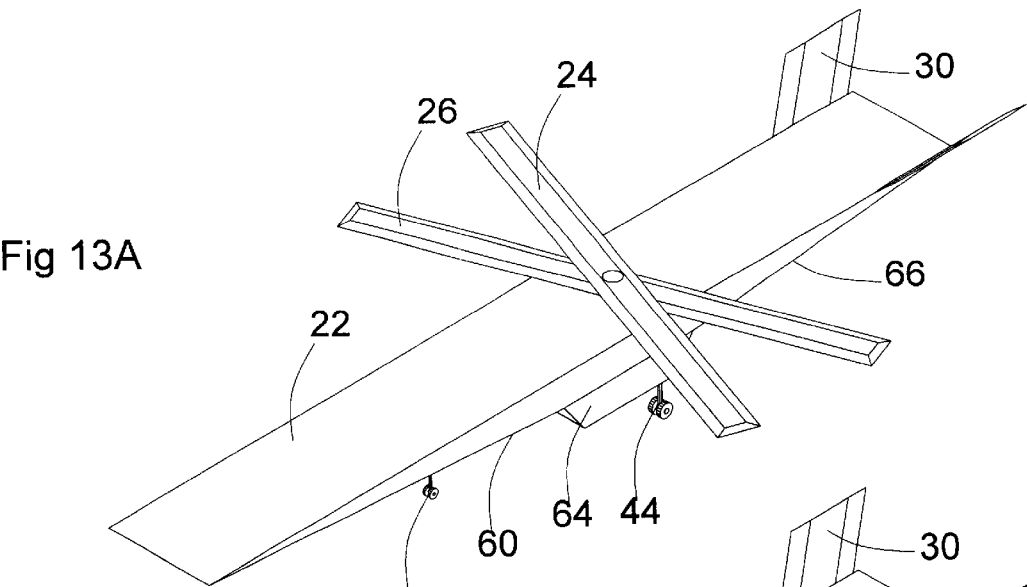
FIG. 13A shows an isometric view of an aerospace plane having a fuselage configuration similar to that of X-43 with both of its main wings mounted on the back of its fuselage taking off from runway with its landing gears stretched out and both of its main wings yawed to a small angle to form a high aspect ratio configuration.
Figure 13B:
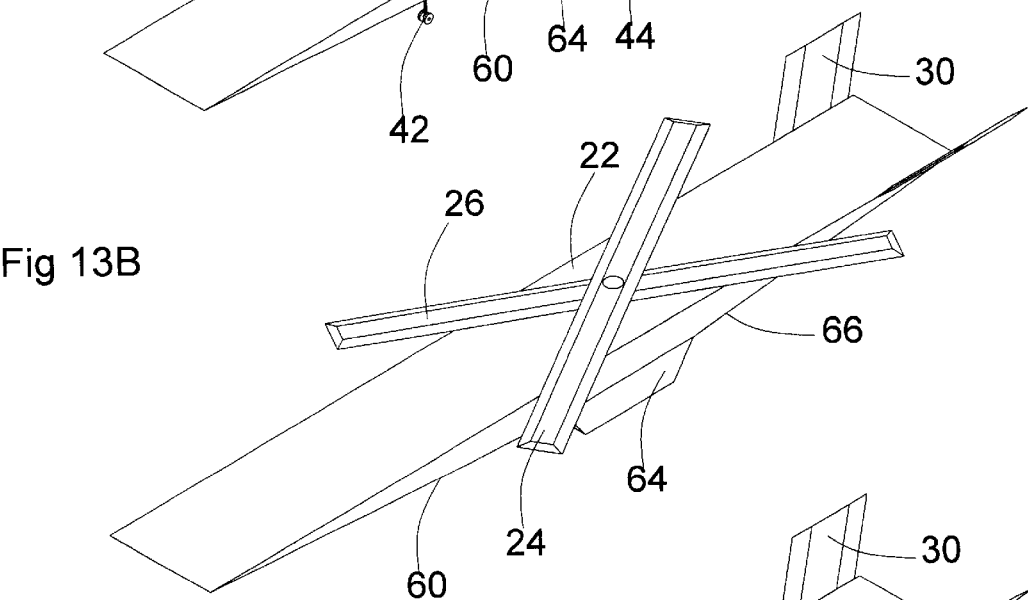
FIG. 13B shows an isometric view of the aerospace plane shown in FIG. 13A climbing and accelerating in the air with both of its main wings yawed to a big angle to maximize its lift-todrag ratio (LID).
Figure 13C:
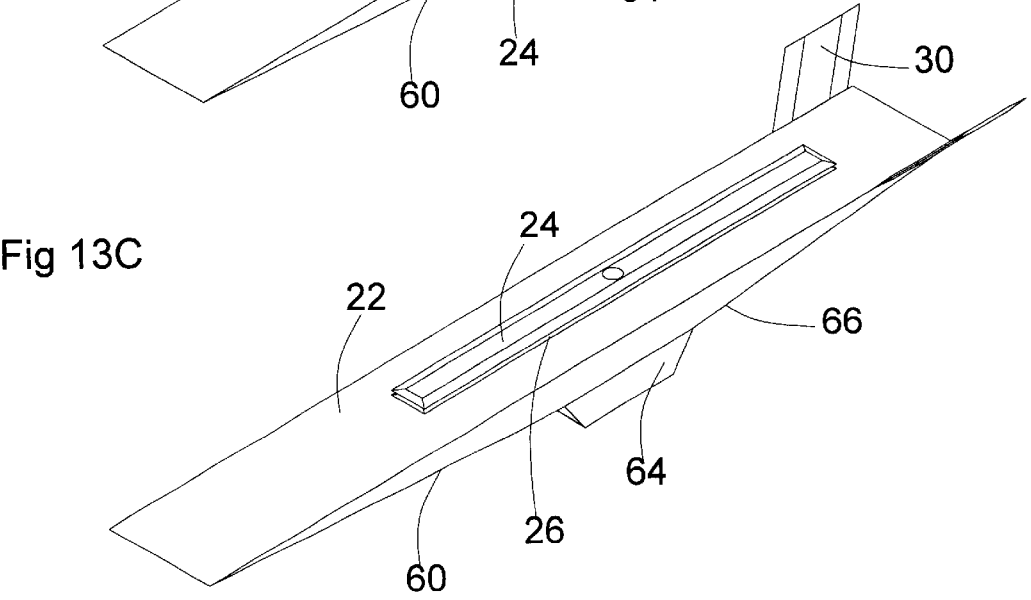
FIG. 13C shows an isometric view of the aerospace plane shown in FIG. 13A flying at a hypersonic speed with both of its main wings yawed to be generally parallel with the longitudinal axis of its fuselage.

Scissors wings can also be installed on the existing configurations of aerospace plane like the one for X-43. FIG. 13A to FIG. 13C show an alternative embodiment of installing scissors wings on existing configurations of aerospace plane.

In FIG. 13A, the aerospace plane is taking off from runway. Both upper main wing 24 and lower main wing 26 are installed on its back and are yawed to a small angle to form a high aspect ratio configuration for the take-off. Its landing gears 42 and 44 are stretched out. The aerospace plane has a "waverider" fuselage with its lower fore body forming a Highly Integrated 2-D Inlet 60 and lower rear body forming a Highly Integrated SERN 66. The engine system consisting of Ramjets/Scramjets 64 and AceTRs are carried at around the middle portion of its lower fuselage. In FIG. 13B, the aerospace plane is climbing and accelerating in the air. Its scissors wings can help it maximize its lift-to-drag ratio (L/D) at a wide range of speed after take-off. FIG. 13C indicates the aerospace plane flying at hypersonic speed. Both of the main wings are yawed to be generally parallel with its fuselage, which forms a "waverider" configuration.

The following three alternative embodiments are three ways to install and arrange main wings on an aerospace plane.

Figures 14A, 14B, 14C:
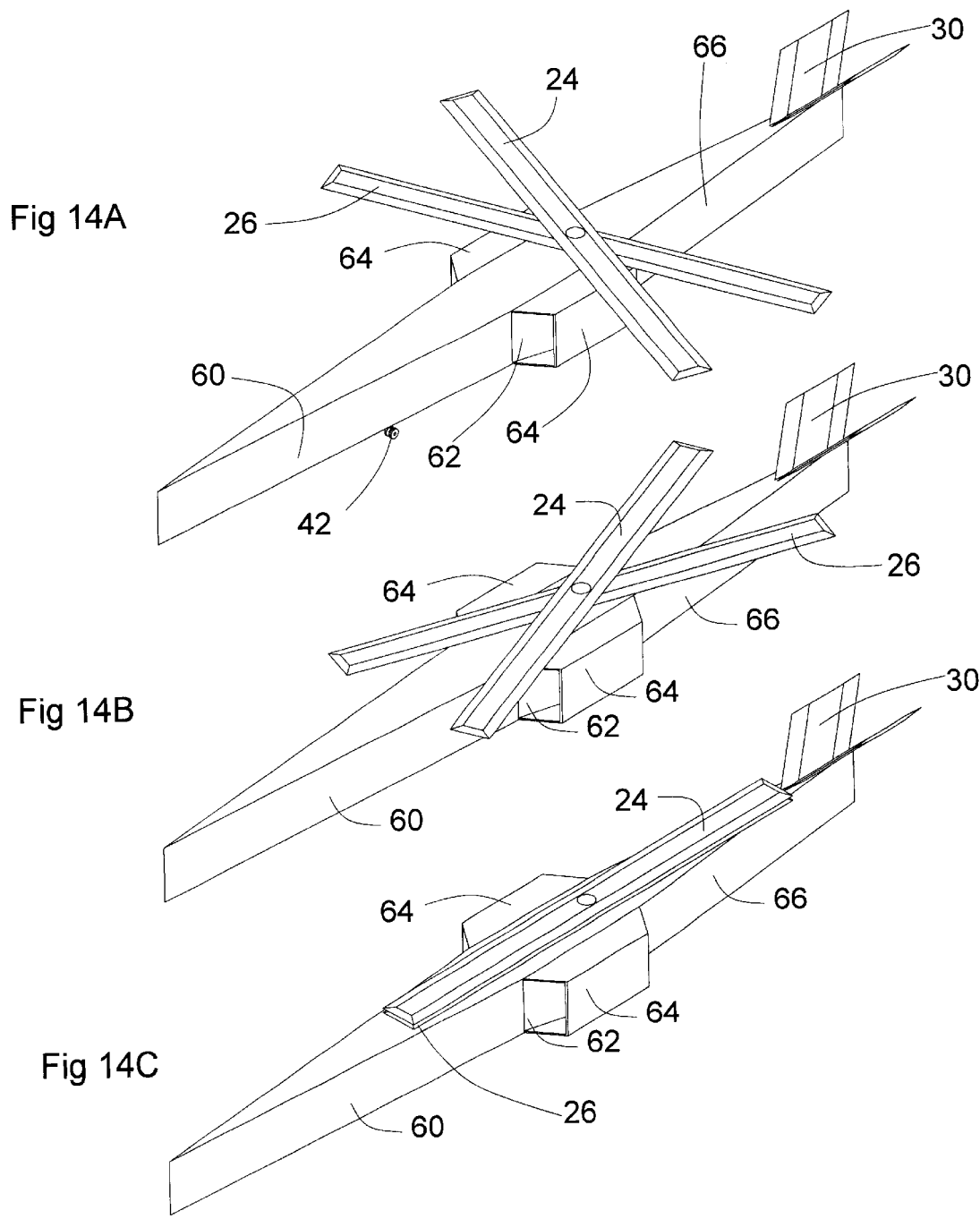
FIG. 14A shows a perspective view of an aerospace plane having both of its main wings mounted on the back of its fuselage taking off from runway with its landing gears stretched out and both of its main wings yawed to a small angle to form a high aspect ratio configuration.
FIG. 14B hows a perspective view of the aerospace plane shown in FIG. 14A climbing and accelerating in the air with both of its main wings yawed to an angle to maximize its lift-to-drag ratio (L/D).
FIG. 14C shows a perspective view of the aerospace plane shown in FIG. 14A flying at a hypersonic speed with both of its main wings yawed to be generally parallel with the longitudinal axis of its fuselage.

FIG. 14A to FIG. 14C show a way to install both main wings at one side of an aerospace plane. The one side can either be the back or belly of the fuselage of the aerospace plane. In FIG. 14A, both upper main wing 24 and lower main wing 26 are installed at the back of an aerospace plane. Also shown in the figure, the aerospace plane is taking off from runway with both of the main wings yawed to a small angle to form a high aspect ratio configuration. In FIG. 14B, the main wings adjust their yaw angle to maximize lift-to-drag ratio (L/D) during the aerospace plane's climb and acceleration in the air. FIG. 14C shows the aerospace plane flying at hypersonic speed with both of the main wings yawed to be generally parallel with the longitudinal axis of the fuselage.

Figure 15A:
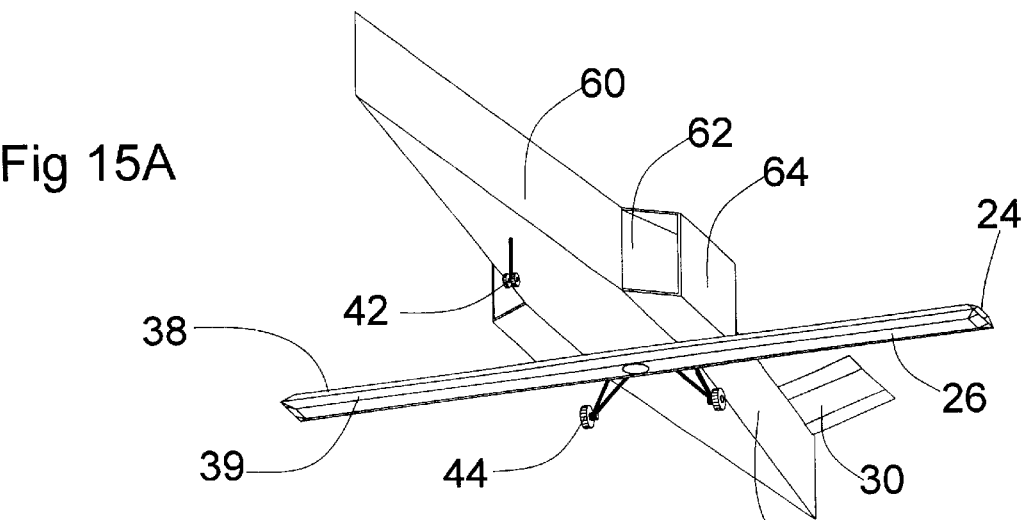
FIG. 15A shows a parallel view of an aerospace plane having both of its main wings mounted beneath its fuselage taking off from runway with its landing gears stretched out and both of its main wings yawed to be generally perpendicular to the longitudinal axis of its axis and form a single wing by dropping their leading and trailing edge flaps and flaperons.
Figure 15B:
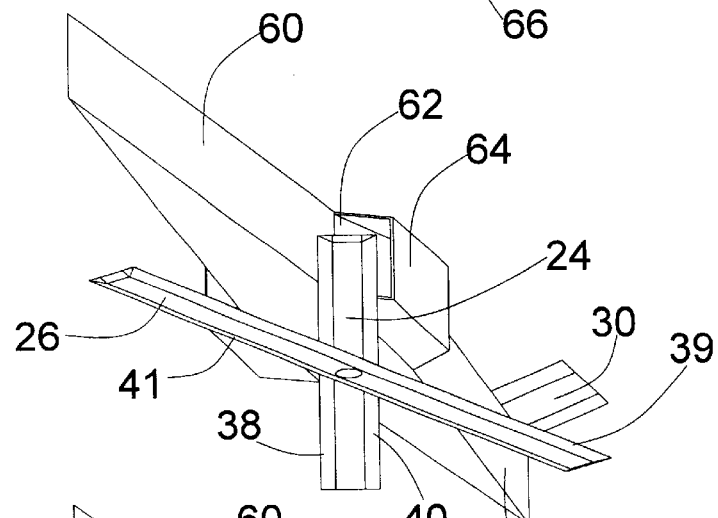
FIG. 15B shows a parallel view of the aerospace plane shown in FIG. 15A climbing and accelerating in the air with both of is main wings yawed to an angle to maximize its lift-to-drag ratio (L/D).
Figure 15C:
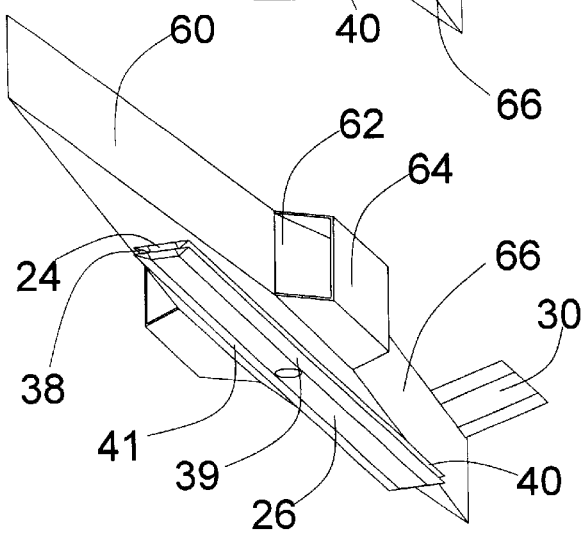
FIG. 15C shows a parallel view of the aerospace plane shown in FIG. 15A flying at a hypersonic speed with both of its main wings yawed to by generally parallel with the longitudinal axis of its fuselage.

FIG. 15A to FIG. 15C show another way to install both main wings at one side of the fuselage of an aerospace plane.

In FIG. 15A, both upper main wing 24 and lower main wing 26 are installed at the belly of an aerospace plane. The aerospace plane is at take-off condition with both of the main wings yawed to be generally perpendicular to the longitudinal axis of the fuselage. Both of the main wings also form a single wing by dropping their leading edge flaps and trailing edge flaperons. That is, leading edge flaps 38 of upper main wing 24 are dropped at a bigger angle than leading edge flaps 39 of lower main wing 26 so that they can touch each other. Similarly, trailing edge flaperons 40 of upper main wing 24 are dropped at a bigger angle than trailing edge flaperons 41 of lower main wing 26 so that they can touch each other. By this way, both of the main wings form a single wing to facilitate the take-off, landing, and low speed flying of the aerospace plane. In FIG. 15B and FIG. 15C, the aerospace climbs and accelerates in the air, and flies at a hypersonic speed, respectively.

Figure 16A:
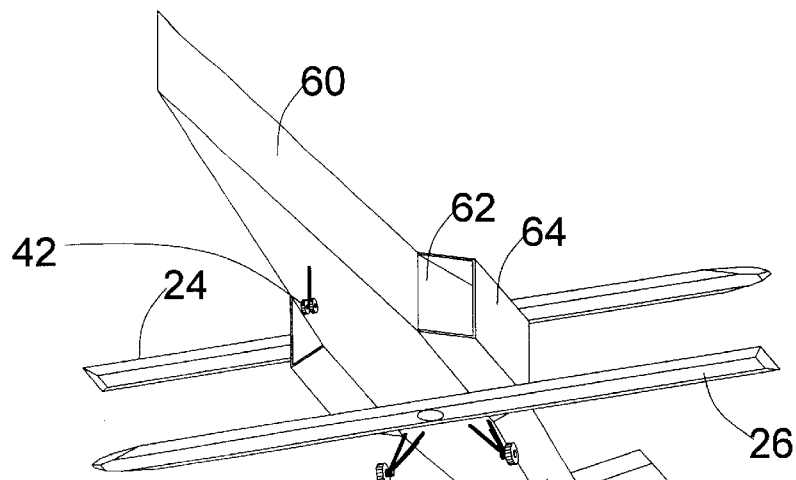
FIG. 16A shows a parallel view of an aerospace plane having asymmetric main wings taking off from runway with its landing gears stretched out and both of asymmetric main wings yawed to be generally perpendicular to the longitudinal axis of its fuselage.
Figure 16B:
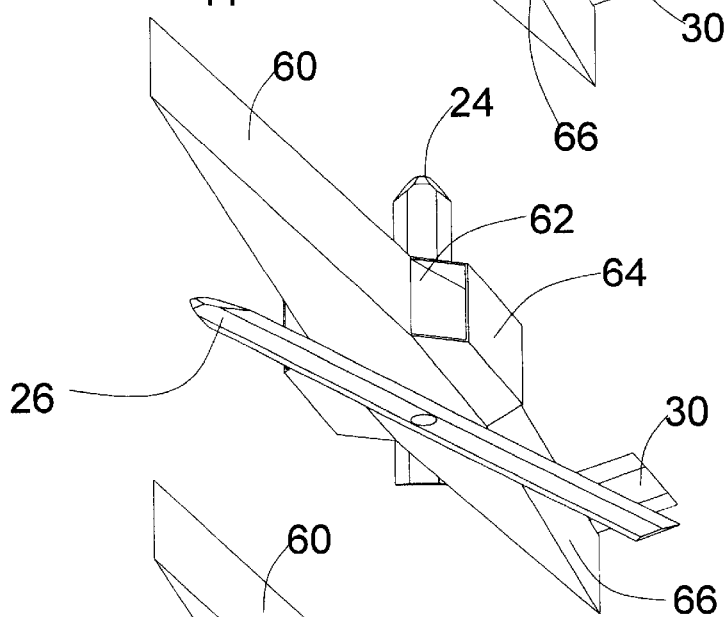
FIG. 16B shows a parallel view of the aerospace plane shown in FIG. 16A climbing and accelerating in the air with both of its asymmetric main wings yawed to an angle to maximize its lift-to-drag ratio (L/D).
Figure 16C:
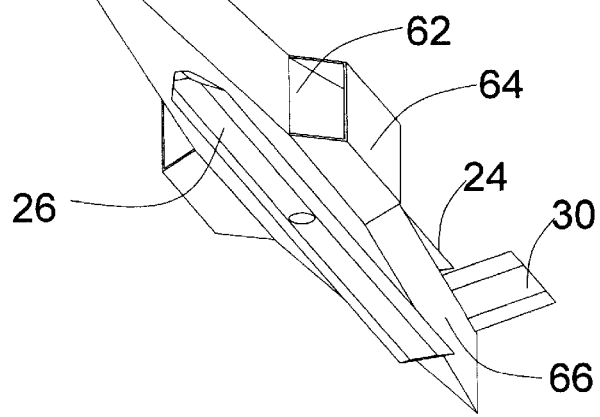
FIG. 16C shows a parallel view of the aerospace plane shown in FIG. 16A flying at a hypersonic speed with both of its asymmetric main wings yawed to be generally parallel with the longitudinal axis of its fuselage.

FIG. 16A to FIG. 16C show another alternative embodiment about the arrangement of main wings. The two main wings of an aerospace plane can either be installed at one side of fuselage or one main wing is at the back and another is at the belly of fuselage. Each of the main wings can have two different half wings in terms of different wingtips, different airfoils, different plane shapes, different lengths, different lift-generating devices, and/or different control surfaces, etc. Shown in FIG. 16A to FIG. 16C, an aerospace plane is taking off, climbing and accelerating in the air, and flying at hypersonic speed, respectively. As indicated in the figures, no matter what angle the main wings is yawed, both of the main wings generate symmetric aerodynamic forces along the longitudinal axis of the fuselage of the aerospace plane even though each main wing does not generated symmetric forces itself.

Figure 17A:
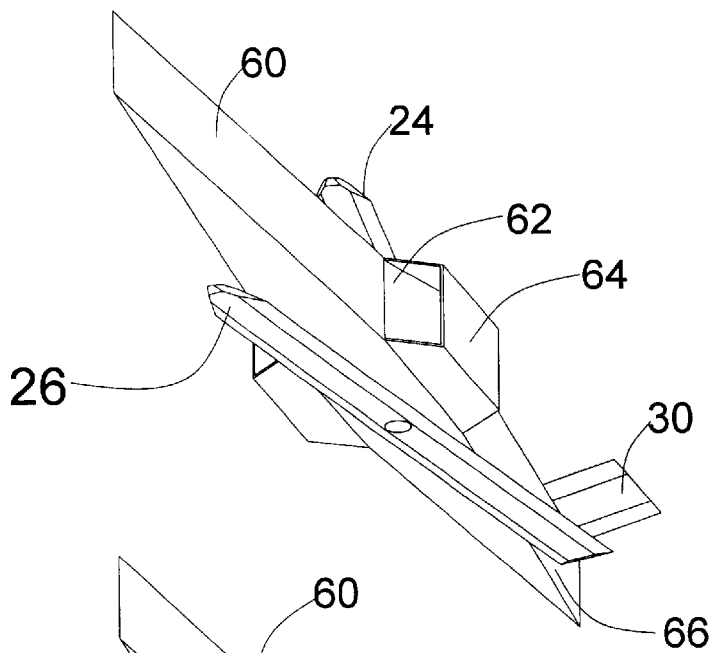
FIG. 17A shows a parallel view of an aerospace plane having two asymmetric main wings flying at a hypersonic speed with both of the main wings yawed to a big angle to generate lift and provide control of the aerospace plane.
Figure 17B:
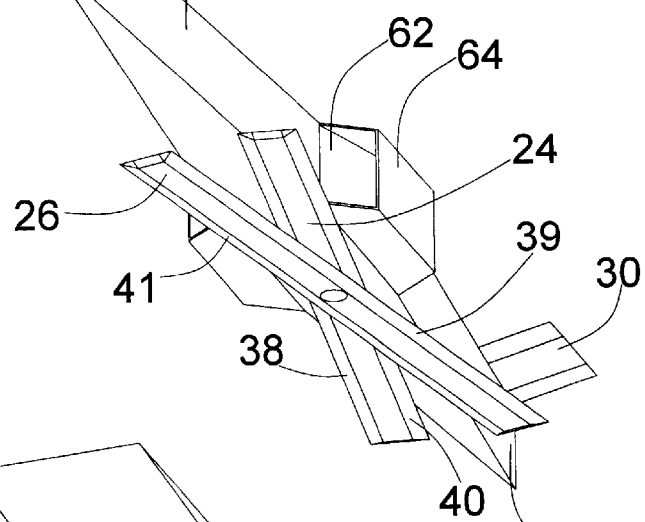
FIG. 17B shows a parallel view of an aerospace plane having both of its main wings installed at the belly of its fuselage flying at a hypersonic speed with both of its main wings yawed to a big angle to generate lift and provide control of the aerospace plane.
Figure 17C:
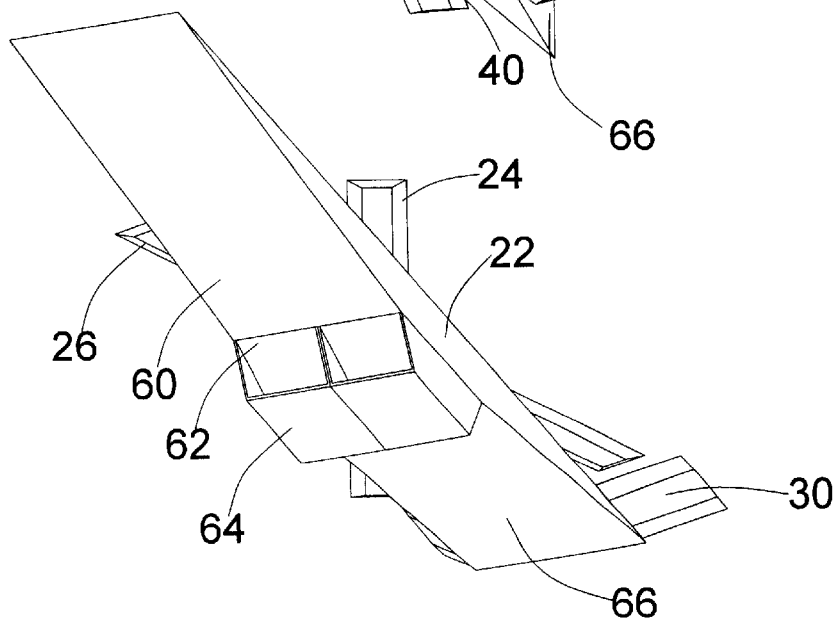
FIG. 17C shows a parallel view of an aerospace plane whose fuselage has a configuration similar to that of X-43 with both of its main wings installed at the back of its fuselage flying at a hypersonic speed with both of its main wings yawed to a big angle to generate lift and provide control of the aerospace plane.

The following alternative embodiment is about the yaw angle of both of the main wings of an aerospace plane flying at hypersonic speed. Besides being generally parallel with the longitudinal axis of the fuselage of an aerospace plane at hypersonic speed, both main wings can also contribute to lift-generating and flight control by being yawed at a big angle. This alternative embodiment can be applied on aerospace planes having scissors wings with all the above-mentioned preferred and alternative embodiments. FIG. 17A to FIG. 17C show three examples.

FIG. 17A shows an aerospace plane having two asymmetric main wings flying at hypersonic speed. Its upper main wing 24 is installed at the back of the fuselage of the aerospace plane and lower main wing 26 is installed at the belly of the fuselage. As indicated in the figure, both of the main wings can generate lift and contribute to the flight control such as pitch and roll control of the aerospace plane.

Similarly, FIG. 17B shows an aerospace plane having both of its main wings installed at the belly of its fuselage. By yawing at a big angle, both of the main wings can also generate lift and contribute to the flight control for the aerospace plane at hypersonic speed.

In FIG. 17C, an aerospace plane has a fuselage similar to that of a "waverider". It has both of its main wings installed at the back of its fuselage. When being yawed at a big angle, both of the main wings can also generate lift and provide flight control for the aerospace plane.

Conclusion, Ramifications, and Scope

Accordingly, the reader will see that the scissors wings configuration can increase the flexibility and efficiency of a spacecraft or aerospace plane's ability to conduct its missions.

The flexibility is first achieved by scissors wings' ability to help fly back boosters and reusable launch vehicles form different connection configurations for vertical launch. Second, scissors wings can make spacecraft and aerospace planes take-off and land on short runways. Third, scissors wings can help air-launch reusable launch vehicles easily separate from the aircraft carrying or towing it at a wide range of speed and quickly achieve stable and sustainable flying condition right after the separation.

The efficiency is first achieved by scissors wings' ability to help spacecraft and aerospace planes take-off, land, and fly in the air under relatively low engine thrust thus relatively small engine(s) can be used and less fuel can be consumed. Second, scissors wings can reduce the weight of the landing gears of spacecraft and aerospace planes because they can achieve low landing speed and low landing impact load on landing gears.

Although the description in the above summary and descriptions contains many specificities, these should not be construed as limiting the scope of the inven tion but as merely providing illustrations of some of the presently preferred embodiments of this invention. For example, instead of having separate air-breathing engine(s) and rocket engine(s), a reusable launch vehicle can have one type of engine(s) such as combined cycle propulsion system(s). And instead of having a tube-like fuselage, a fly back booster and reusable launch vehicle can have other shapes of fuselage. On the contrary, within the scope of protection, the configuration according to the invention may also assume embodiments other than those described above. In this case, the configuration may, in particular, have features that constitute a combination of the respective individual features of the claims.

I claim:

1. An aerospace apparatus for providing thrust to power a transportation system to fly in an air environment toward orbit, or for flying from an air environment to orbit, said aerospace apparatus comprising:
   (a) a fuselage, and
   (b) two wing means for generating aerodynamic lift, and
   (c) each of said two wing means having a left-side wing and a right-side wing, and
   (d) at least one pivot means for rotatable installing said two wing means on said fuselage, and
   (e) at least one yawing means for yawing said two wing means about said pivot means in opposite directions, and
   (f). within the yawing range of said two wing means, said yawing means being able to yaw and set said two wing means to their most stretched position where the wingtips of said two wing means having a first distance away from said fuselage, and
   (g). within the yawing range of said two wing means, said yawing means also being able to yaw and set said two wing means to their closed position where the wingtips of said two wing means having a second distance away from said fuselage, and
   (h). within the yawing range of said two wing means, said yawing means also being able to yaw and set said two wing means to positions where the distance from the wingtips of said two wing means to said fuselage being larger than said second distance and smaller than said first distance.

* * * * *